United States Patent [19]
Molyneaux et al.

[11] Patent Number: 5,475,818
[45] Date of Patent: Dec. 12, 1995

[54] COMMUNICATIONS CONTROLLER CENTRAL PROCESSING UNIT BOARD

[75] Inventors: William F. Molyneaux, North Huntington; Pierre Zuber, Bethel Park, both of Pa.

[73] Assignee: AEG Transportation Systems, Inc., Pittsburgh, Pa.

[21] Appl. No.: 250,866

[22] Filed: May 26, 1994

Related U.S. Application Data

[63] Continuation of Ser. No. 853,402, Mar. 18, 1992, abandoned.

[51] Int. Cl.$^6$ .................................................. G06F 15/17
[52] U.S. Cl. ............... 395/200.05; 364/940; 364/240.8; 364/426.05; 395/308; 395/650; 395/200.12
[58] Field of Search .................................... 395/200, 500, 395/800; 455/3.1; 375/38

[56] References Cited

U.S. PATENT DOCUMENTS

| | | | |
|---|---|---|---|
| 4,075,691 | 2/1978 | Davis | 395/275 |
| 4,200,930 | 4/1980 | Rawlings | 395/200 |
| 4,281,315 | 7/1981 | Bauer | 340/825.8 |
| 4,385,384 | 5/1983 | Rosbury et al. | 371/22 |
| 4,780,814 | 10/1988 | Hayek | 395/325 |
| 4,961,140 | 10/1990 | Pechanek et al. | 395/325 |

OTHER PUBLICATIONS

ISO 4335, Third Edition, "Information Processing Systems Data Communication–High–Level Data Link Control Elements of Procedures," International Organization for Standardization, Jan. 8, 1987.

Draft DIN 43322 German Standard specification, Parts 1, 2, 4 and 5 dated Jun. 1988 and Part 5 dated Jul. 1988 (Parts 1 to 5 in English–Part 4 in German also).

"HEX32: Hexidecimal Object File Format Specification Revision A," Intel, Jan. 6, 1988, pp. 1 to 8.

*Primary Examiner*—David Y. Eng
*Attorney, Agent, or Firm*—Webb Ziesenheim Bruening Logsdon Orkin & Hanson

[57] ABSTRACT

A microprocessor based data communications controller board includes at least one microprocessor and is for controlling communications over a plurality of busses having different electrical specifications and using different communications procedures. The board includes a first interface for interfacing the microprocessor based data communications controller board with a first communications bus providing a multidrop serial master-slave synchronous data link controlled communications system. The board also includes a second interface for interfacing the microprocessor based data communications controller board with at least one second communications bus providing a Manchester encoded multidrop master-slave high-level data link controlled communications system. And the board also includes a third interface for interfacing the microprocessor based data communications controller board with a third communications bus providing a parallel processor-to-processor message passing communications system.

4 Claims, 31 Drawing Sheets

```
module PWR86
title                                              pwr pal
            "RefDes=U6"
       D5621B99  device `P16V8R';

bclk      pin 1;
    psbrst    pin 2;      "(input combinatorial)"
    dclow     pin 3;      "(input combinatorial)"
    wdt       pin 4;      "(input combinatorial)"
    !lowdc    pin 5;      "(input combinatorial)"
    !reset2   pin 6;      "(input combinatorial)"
    bled      pin 7;      "(input combinatorial)"
    !pbrst    pin 8;      "(input combinatorial)"
    !reset1   pin 9;      "(input combinatorial)"
    !oe       pin 11;
    nmi       pin 12;     "(active_high)"
    !resetin  pin 13;     "(active_low)"
    warmrst   pin 14;     "(active_high registered)"
    !coldst   pin 15;     "(active_low registered)"
    rst51     pin 16;     "(active_high registered)"
    unint     pin 17;     "(active_high registered)"
    !yel      pin 18;     "(active_low)"
    !red      pin 19;     "(active_low)"

equations nmi = dclow # lowdc ;

unint = wdt ;

coldst : = psbrst & !dclow
             # psbrst & coldst ;

rst51 : = psbrst & dclow ;

resetin = psbrst # reset2 # reset1 # pbrst ;

yel : = bled ;

red : = coldst ;

warmrst = pbrst ;

end PWR86
```

FIG. 13

```
MODULE COM186_1;
FLAG '-R3',' -t4';
TITLE '
        ADDRESS DECODER FOR COM186 ASSEMBLY XXXPXXXG01
        PART No:
        '
        "RefDes=U56"

D5622B07                DEVICE 'P22V10';

CLK, HLDA, RST, MBWT, REGSEL, MEMSEL, IOSEL     PIN 1, 2, 3, 4, 5, 6, 7;
        MPCW, INTW, IOW, MBCS                           PIN 8, 9, 10, 11;
        OE, MBIR, AREADY, READY                         PIN 13, 14, 15, 16;
        S2, S1, S0, RESET                               PIN 17, 18, 19, 20;
        BHLDA, ARDY, ALE                                PIN 12, 24:
        GND, VCC                                        [S2, S1, SC];
        SRG =

A=7; B=6; C=5; D=4; E=3; F=2; G=1; J=0;

H, L, X =       1, 0, . X.;

S2, S1, S0              ISTYPE 'POS, FEED_REG';
        HLDA, ARDY, AREADY      ISTYPE 'POS, COM';
        RESET                   ISTYPE 'NEG, COM';
EQUATIONS
        ARDY    =       READY & !RST;
        "During reset 82258 ARDY must be low to put ADMA into 186 mode
        BHLDA   =       HLDA & !RST;
        !RESET  =       RST;

!AREADY =       !READY
                        # !MEMSEL & !MPCW
                        # !IOSEL & !MPCW
                        # !REGSEL & !MPCW
                        # !INTW
                        # !MBCS & !MBWT;
STATE_DIAGRAM SRG;
        STATE A:
                READY = 1;
                IF ALE THEN B;
                    ELSE A;
        STATE B:
                READY = 0;
                IF !IOW THEN C;
                    ELSE IF !INTW THEN D; "If INTA cycle, must wait for MB l
                                           "to get bus and broadcast INTA pulse
                    ELSE A;
        STATE C:
                READY = 0;
                GOTO A;             "1 wait state needed for 85c30
                                     "INTA cycle waits for multibus I
        STATE D:
                READY = 0;
                IF !MBWT & !RST THEN D;
                    ELSE A;
```

FIG. 14a

```
        STATE E:
                GOTO A;
        STATE F:
                GOTO A;
        STATE G:
                GOTO A;
        STATE J:
                GOTO A;
TEST_VECTORS
([CLK, ALE, REGSEL, MEMSEL, IOSEL, MPCW, INTW, MBCS, MBWT, RST, IOW]->[SRG, AREADY, READY, ARDY])
[.C., X , X , X , X , X , H , H , X , L , X ]>[ X , X , X , X ];
[.C., L , H , H , H , H , H , H , X , L , H ]>[ 7 , H , H , H ];
[.C., H , X , X , X , H , H , H , X , L , H ]>[ 6 , L , L , L ];
[.C., L , L , H , H , L , H , H , X , L , H ]>[ 7 , L , H , H ];
[.C., L , L , H , H , L , H , H , X , L , H ]>[ 7 , L , H , H ];
[.C., L , L , H , H , H , H , H , X , L , H ]>[ 7 , H , H , H ];
TEST_VECTORS
([CLK, ALE, REGSEL, MEMSEL, IOSEL, MPCW, INTW, MBCS, MBWT, RST, IOW]->[SRG, AREADY, READY, ARDY])
[.C., H , X , X , X , H , H , H , X , L , X ]>[ 6 , L , L , L ];
[.C., L , H , L , H , L , H , H , X , L , H ]>[ 7 , L , H , H ];
[.C., L , H , L , H , L , H , H , X , L , H ]>[ 7 , L , H , H ];
[.C., L , H , L , H , H , H , H , X , L , H ]>[ 7 , H , H , H ];
TEST_VECTORS
([CLK, ALE, REGSEL, MEMSEL, IOSEL, MPCW, INTW, MBCS, MBWT, RST, IOW]->[SRG, AREADY, READY, ARDY])
[.C., H , X , X , X , H , H , H , X , L , X ]>[ 6 , L , L , L ];
[.C., L , H , H , L , L , H , H , X , L , H ]>[ 7 , L , H , H ];
[.C., L , H , H , L , L , H , H , X , L , H ]>[ 7 , L , H , H ];
[.C., L , H , H , L , H , H , H , X , L , H ]>[ 7 , H , H , H ];
[.C., H , X , X , X , H , H , H , X , L , H ]>[ 6 , L , L , L ];
[.C., L , H , H , H , H , H , H , X , L , H ]>[ 7 , H , H , H ];
TEST_VECTORS
([CLK, ALE, REGSEL, MEMSEL, IOSEL, MPCW, INTW, MBCS, MBWT, RST, IOW]->[SRG, AREADY, READY, ARDY])
[.C., H , X , X , X , X , H , X , X , L , X ]>[ 6 , L , L , L ];
[.C., L , H , H , H , H , H , L , L , L , H ]>[ 7 , L , H , H ];
[.C., L , H , H , H , H , H , L , L , L , H ]>[ 7 , L , H , H ];
[.C., L , H , H , H , H , H , L , H , L , H ]>[ 7 , H , H , H ];
```

FIG. 14b

```
TEST_VECTORS
([CLK, ALE, REGSEL, MEMSEL, IOSEL, MPCW, INTW, MBCS, MBWT, RST, IOW]->[SRG, AREADY, READY, ARDY])
[.C., H , X , X , X , H , X , X , X , L , X ]>[ 6 , L , L , L ];
[.C., L , H , H , H , H , H , H , X , L , L ]>[ 5 , L , L , L ];
[.C., L , H , H , H , H , H , H , X , L , L ]>[ 7 , H , H , H ];
TEST_VECTORS
([CLK, ALE, REGSEL, MEMSEL, IOSEL, MPCW, INTW, MBCS, MBWT, RST, IOW]->[SRG, AREADY, READY, ARDY])
[.C., H , X , X , X , H , X , X , X , L , H ]>[ 6 , L , L , L ];
[.C., L , X , X , X , H , L , X , L , L , H ]>[ 4 , L , L , L ];
[.C., L , X , X , X , H , L , X , L , L , H ]>[ 4 , L , L , L ];
[.C., L , X , X , X , H , H , X , H , L , H ]>[ 7 , H , H , H ];
[.C., L , X , X , X , H , H , X , H , L , H ]>[ 7 , H , H , H ];
END COM186_1;
```

FIG. 14c

```
MODULE COM186_5;

TITLE '
      MEMORY DECODER FOR COM186 ASSEMBLY XXXPXXXG01
      PART No:

"RefDes=U53"

D5622B05                          DEVICE 'P20v8c';

LS2, A19, A18, A17, A16, A15, A14, A13, A12, A11    PIN 1, 2, 3, 4, 5, 6, 7, 8, 9, 10;
      X0, X1, X2, !DEN                                     PIN 11, 13, 14, 23;
      !INTA, !MBCS, !MBDEN, !LOWIO                         PIN 19, 20, 21, 22;
      !IOSEL, !MEMSEL, !RAMCS, !EPROMCS                    PIN 15, 16, 17, 18;
      GND, VCC                                             PIN 12, 24;

H, L, X   =     1, 0, .X.;
      ADDRESS=        [A19..A11, X, X, X,  X, X, X, X,  X, X, X, X] ;

EQUATIONS

RAMCS    = (ADDRESS <= ^H3FFFF) & LS2 ;

MEMSEL   = (ADDRESS >= ^H40000) & (ADDRESS <= ^H7FFFF) & LS2 ;

EPROMCS  = (ADDRESS >= ^H90000) & (ADDRESS <= ^HFFFFF) & LS2 ;

IOSEL    =      0 ;

MBCS     =      (ADDRESS >= ^H80000) & (ADDRESS <= ^H8FFFF) & LS2 & !IN
TA
               #      (ADDRESS >= ^H08000) & (ADDRESS <= ^H0FFFF) & !LS2 & !IN
TA ;
      LOWIO  = (  (ADDRESS >= ^H00000) & (ADDRESS <= ^H007FF)
               #  (ADDRESS >= ^H00C00) & (ADDRESS <= ^H07FFF)  )
                   & !LS2 & !INTA ;
      MBDEN  =       MBCS & DEN ;

END COM186_5 ;
```

FIG. 15

```
MODULE COM186_6;
FLAG '-R3', '-t4';
TITLE '
        I/O DECODER FOR COM186 ASSEMBLY XXXPXXXG01
        PART No:

"RefDes = U49"

D5622B04                DEVICE 'P22V10';

A10, A9, A8, A7, A6, A5, A4, A3, A2, A1, BIO      PIN 1, 2, 3, 4, 5, 6, 7, 8, 9, 10, 11;
    REGSEL, ACK0, ACK1, PSBWIN, IOEN                  PIN 19, 20, 21, 22, 23;
    IOWAIT, ADMACS, C30CS3, C30CS2, C30CS1            PIN 14, 15, 16, 17, 18;
    WR                                                PIN 13;
    GND, VCC                                          PIN 12, 24;

H, L, X   =             1, 0, .X.;
    ADDRESS =               [A10..A1, X];

EQUATIONS

!REGSEL =               (ADDRESS >= ^H0000) & (ADDRESS <= ^H003C) & !BIO;
    !ACK0   =               (ADDRESS == ^H0040) & !BIO;
    !ACK1   =               (ADDRESS == ^H0042) & !BIO;
    !PSBWIN =               (ADDRESS == ^H00F0) & !BIO & !WR;
    !IOEN   =               !BIO;        "enable io data bus
    !IOWAIT =               (ADDRESS <= ^H03FF) & !BIO;        "wait state io space
    !C30CS1 =               (ADDRESS >= ^H0100) & (ADDRESS <= ^H01FF) & !BIO;
    !C30CS2 =               (ADDRESS >= ^H0200) & (ADDRESS <= ^H02FF) & !BIO;
    !C30CS3 =               (ADDRESS >= ^H0300) & (ADDRESS <= ^H03FF) & !BIO;
    !ADMACS =               (ADDRESS >= ^H0400) & (ADDRESS <= ^H04FF) & !BIO;

TEST_VECTORS ( [ADDRESS, BIO, WR]  -> [REGSEL, ACK0, ACK1, PSBWIN, C30CS1, C30CS2, C30CS3, ADMACS, IOEN];
    [   X    , H , X ] -> [ H , H , H , H , H , H , H , H , H ];
    [ ^H0000 , L , X ] -> [ L , H , H , H , H , H , H , H , L ];
    [ ^H0030 , L , X ] -> [ L , H , H , H , H , H , H , H , L ];
    [ ^H0040 , L , X ] -> [ H , L , H , H , H , H , H , H , L ];
    [ ^H0042 , L , X ] -> [ H , H , L , H , H , H , H , H , L ];
    [ ^H00F0 , L , H ] -> [ H , H , H , H , H , H , H , H , L ];
    [ ^H00F0 , L , L ] -> [ H , H , H , L , H , H , H , H , L ];
    [ ^H0100 , L , X ] -> [ H , H , H , H , L , H , H , H , L ];
    [ ^H01FF , L , X ] -> [ H , H , H , H , L , H , H , H , L ];
    [ ^H0200 , L , X ] -> [ H , H , H , H , H , L , H , H , L ];
    [ ^H02FF , L , X ] -> [ H , H , H , H , H , L , H , H , L ];
    [ ^H0300 , L , X ] -> [ H , H , H , H , H , H , L , H , L ];
    [ ^H03FF , L , X ] -> [ H , H , H , H , H , H , L , H , L ];
    [ ^H0400 , L , X ] -> [ H , H , H , H , H , H , H , L , L ];
    [ ^H04FF , L , X ] -> [ H , H , H , H , H , H , H , L , L ];

END COM186_6;
```

FIG. 16

```
MODULE COM186_7;

TITLE '
        DECODER FOR COM186 ASSEMBLY XXXPXXXG01
        PART No:

"RefDes = U48"

D5622B03                    DEVICE  'P16V8S';

CLK, A0, ALE, LBHE, WR, DEN, IBEN, IOEN, LS0      PIN 1,2,3,4,5,6,7,8,9;
        NU1, LS1, LS2, ADMA, EINTA, WRL, WRH, IODEN, AS   PIN 11,12,13,14,15,16,17,18,19;
        GND, VCC                                          PIN 10,20;

H,L,X  =           1,0,.X.;

EQUATIONS

!AS    =           ALE;
        !WRH   =           A0 & !LBHE & !WR
                       #   !A0 & !LBHE & !WR;

!WRL   =           ALE;
                           !A0 & LBHE & !WR
                       #   !A0 & !LBHE & !WR;

!EINTA =           !LS0 & !LS1 & !LS2;

!IODEN =           !DEN & ADMA & IBEN ;

END COM186_7;
```

FIG. 17

```
MODULE COM186_8;
TITLE '
        85c30 CONTROL PAL FOR COM 186 ASSEMBLY
        PART No:

"RefDes=U46"

D5622B012                    DEVICE              'P16V8R' ;

CLK, RD, WR, INTA, CAS0, CAS1         PIN 1,2,3,4,5,6;
        CAS2, LOCK, RST                       PIN 7,8,9;
        NU1, SCCINTA1_L, S0, S1, DLYRD        PIN 11,12,13,14,15;
   SCCINTA2_L, DLYWR, SCCWR, SCCRD            PIN 16,17,18,19;
        GND, VCC                              PIN 10,20;

H,L,X   =   1,0,.X. ;
            EQUATIONS

!DLYRD    :=    !RD;
!DLYWR    :=    !WR;
!SCCRD    =     !RD & !DLYRD
                # RST
                # !S1 & !S0 & !INTA ;

!SCCWR =        !WR & !DLYWR
                # RST ;

SCCINTA2_L = 1 ;

SCCINTA1_L = 1 ;

END COM186_8 ;
```

FIG. 18

```
MODULE COM186_15 ;

TITLE '
    REQUEST TO SEND PAL '

"RefDes=U59"

D5622B08              DEVICE           'P16V8s' ;

!RTSA1_L, !RTSB2_L, !RTSA3_L, !RTSB4_L          PIN 2,3,4,5;
!ACD1_L, !ACD2_L, !ACD3_L, !ACD4_L                PIN 6,7,8,9;
!RTS_OUT1_L, !RTS_OUT2_L, !RTS_OUT3_L          PIN 19,18,17;
!RTS_OUT4_L, GND, VCC                          PIN 16,10,20;

EQUATIONS

RTS_OUT1_L = RTSA1_L & !ACD1_L;
RTS_OUT2_L = RTSB2_L & !ACD2_L;
RTS_OUT3_L = RTSA3_L & !ACD3_L;
RTS_OUT4_L = RTSB4_L & !ACD4_L;

END COM186_15;
```

FIG. 19

```
MODULE COM186_9 ;
FLAG '-R3', '-t4' ;
TITLE '
       INTERRUPT WAIT STATE GENERATOR AND SLAVE INTERRUPT
       DECODER FOR COM 186 ASSEMBLY
       PART No:
       '
       "RefDes = U45"

D5622B01              DEVICE                     'P16V8R' ;

CLK, CAS0, CAS1, CAS2, MBEN, SBEN    PIN 1, 2, 3, 4, 5, 6 ;
       INTA, RESET                          PIN 8, 9 ;
       OE, NU1, INTWAIT, S1, S0             PIN 11, 12, 13, 14, 15 ;
       IBEN, COE, SLINT                     PIN 17, 18, 19 ;
       GND, VCC                             PIN 10, 20 ;

SREG                                 = [S1, S0] ;
       CASC                                 = [CAS2, CAS1, CAS0] ;

A = 0 ;  B = 1 ;  C = 2 ;  D = 3 ;

H, L, X =                            1, 0, .X. ;

SLINT           IsType 'pos, com' ;
       S0, S1          IsType 'pos, reg, feed_reg' ;

EQUATIONS

!IBEN  =        CAS2 & !CAS1 & CAS0 & !RESET ;     " MB 1 will drive AD bus

!SLINT =        !CAS0 & CAS1 & CAS2 & !RESET ;

!COE   =        CAS2 & !CAS1 & CAS0 & !RESET ;     "cas5 IS MB I vectored

STATE_DIAGRAM SREG ;
       STATE A :
              INTWAIT = 1 ;
              IF !INTA THEN B ;
                  ELSE A ;
       STATE B :
              INTWAIT = 0 ;
              IF !INTA THEN C ;

STATE C :
              INTWAIT = 0 ;
              IF !INTA THEN D ;

STATE D :
              INTWAIT = 1 ;
              IF !INTA THEN D ;
                  ELSE A ;
END COM186_9 ;
```

FIG. 20

```
MODULE COM186_10 ;
FLAG '-R3' , '-t4' ;
TITLE
        MULTIBUS I CONTROL LINES FOR COM 186 ASSEMBLY
        PART No:

"RefDes = U60 "
                                                    'P22V10' ;
        D5622B09            DEVICE

CLK        pin 1 ;
        !p2int     pin 2 ;
        !COE       pin 3 ;
        M_IO       pin 4 ;
        !RD        pin 5 ;
        !WR        pin 6 ;
        !INTA      pin 7 ;
        !XACK      pin 8 ;
        RST        pin 9 ;
        !MBCS      pin 10 ;
        !AEN       pin 11 ;
        NU2        pin 13 ;
        S2         pin 14 ;
        S1         pin 15 ;
        S0         pin 16 ;
        !MOE       pin 17 ;
        !DEN       pin 18 ;
        !IOWC      pin 19 ;
        !IORC      pin 20 ;
        !MWTC      pin 21 ;
        !MRDC      pin 22 ;
        !MBWT      pin 23 ;

GND, VCC                    PIN 12, 24 ;
            SREG =                  [ S2, S1, S0 ] ;

A = 7; "
            B = 6 ;
            C = 5 ; "MCE (cascade enable );
            D = 4 ; "DEN ; COE ; MCE (cascade enable ) ; WAIT ;
            E = 3 ; "DEN
            F = 2 ; "MULTIBUS CYCLE ; DEN
            G = 1 ;
            J = 0 ;
            H, L, X, TRUE, FALSE    =          1, 0, .X., 1, 0 ;

EQUATIONS

"MRDC   = RD & M_IO & MBCS & AEN & !S2 & S1 & !S0 ;

"MWTC   = WR & M_IO & MBCS & AEN & !S2 & S1 & !S0 ;

"IORC   = RD & !M_IO & MBCS & AEN & !S2 & S1 & !S0 ;

"IOWC   = WR & !M_IO & MBCS & AEN & !S2 & S1 & !S0 ;

" DEN   = COE & S2 & !S1 & !S0
```

FIG. 21a

```
"              #            !S2 & S1 & S0
"              #            !S2 & S1 & !S0 ;
"MCE  = S2 & !S1 & !S0
"      # S2 & !S1 & S0 ;

MBWT = !AEN & MBCS       "Wait if: 1) . I don't have bus and access it
     # !XACK & MBCS      " 2) . I have bus but XACK is HI
     # COE & !XACK & S2 & !S1 & !S0 " 3) . 2nd INTA cycle for MBI & XACK HI
     # COE & !AEN & INTA ;       " 4) . I don't have bus for INTA cycle STATE_DIAGRAM SREG ;
        STATE A :                         " idle
                MCE  = FALSE ;
                DEN  = FALSE ;
                MRDC = FALSE ;
                MWTC = FALSE ;
                IORC = FALSE ;
                IOWC = FALSE ;
                IF   (INTA & AEN & !RST ) THEN B ;
                        ELSE IF (RD & MBCS & AEN & !RST )
                                # (WR & MBCS & AEN & !RST )
                                        THEN E ;
                                ELSE A ;
        STATE B :
                MCE  = FALSE ;          "first int cycle
                DEN  = FALSE ;
                MRDC = FALSE ;
                MWTC = FALSE ;
                IORC = FALSE ;
                IOWC = FALSE ;
                IF   (INTA & !RST ) THEN B ;
                        ELSE IF (!INTA & !RST ) THEN C ;
                        ELSE A ;
        STATE C :
                MCE  = TRUE ;
                DEN  = FALSE ;
                MRDC = FALSE ;
                MWTC = FALSE ;
                IORC = FALSE ;
                IOWC = FALSE ;
IF   (!INTA & !RST ) THEN C ;
                        ELSE IF (INTA & !RST ) THEN D ;
        STATE D :           ELSE A ;
                DEN  = COE ;
                MCE  = TRUE ;
                MRDC = FALSE ;
                MWTC = FALSE ;
                IORC = FALSE ;
                IOWC = FALSE ;
                    IF   (INTA & !RST ) THEN D ;
                            ELSE A ;
        STATE E :
                MCE  = FALSE ;
                DEN  = TRUE ;
                MRDC = FALSE ;
                MWTC = FALSE ;
                IORC = FALSE ;
```

FIG. 21b

```
            IOWC  = FALSE ;
    IF    (RD & !RST & AEN & MBCS )
              # (WR & !RST & AEN & MBCS ) THEN F ;
                  ELSE A ;

STATE F :
                  MCE = FALSE ;
        MRDC  = RD & M_IO & MBCS & AEN ;
        MWTC  = WR & M_IO & MBCS & AEN ;
         IORC  = RD & !M_IO & MBCS & AEN ;
         IOWC  = WR & !M_IO & MBCS & AEN ;
         DEN = TRUE ;

IF !RD & !WR THEN A ;
                        ELSE IF RST THEN A ;
                        ELSE F ;

STATE G :
            GOTO A ;

STATE J :
            GOTO A ;

TEST_VECTORS ( [ !AEN, !MBCS, !XACK, !COE, !INTA, S2, S1, S0]  ->   [ !MBWT] ) ;
    [ H , H , H , H , H , L , H , H ]  ->  [ H  ] ;
    [ H , L , H , H , H , L , H , H ]  ->  [ L  ] ;
    [ H , L , L , H , H , L , H , H ]  ->  [ L  ] ;
    [ L , L , H , H , H , L , H , H ]  ->  [ L  ] ;
    [ L , L , L , H , H , L , H , H ]  ->  [ H  ] ;
END COM186_10 ;
```

FIG. 21c

```
MODULE COM186_11 ;
FLAG '-R3' , ' -t4 ' ;
TIITLE '
         MULTIBUS I ARBITER FOR COM 186 ASSEMBLY XXXPXXX G01
         PART No :

"RefDes= U54. abl

D5622B06         DEVICE           'P16V8R' ;

BCLK, RD, WR, SRQ, RST, BPRN              PIN 1, 2, 3, 4, 5, 6 ;
MCE, LOCK, P2INT                          PIN 7, 8, 9 ;
OE, CBRQ, BSY, SYNC, HRQ, AEN             PIN 11, 12, 13, 14, 15, 16 ;
ABEN, BREQ, BPRO                          PIN 17, 18, 19 ;
GND, VCC                                  PIN 10, 20 ;

C, H, L, X, Z              =              . C. , 1, 0, 1, .Z. ;

AEN, HRQ, SYNC                            ISTYPE 'reg_d' ;

EQUATIONS
         !BPRO         =       HRQ & !BPRN ;
         !BREQ         =       !HRQ & AEN ;
                                           "Request ( or retain ) Bus for :
         !AEN          :=      !RST & !AEN & !HRQ & !P2INT    " 1 ). Hold bus for INTA cycle
                       #       !RST & !AEN &  !HRQ & !RD      " 2 ). Hold bus for RD cycle
                       #       !RST & !AEN & !HRQ & !WR       " 3 ). Hold bus for WR cycle
                       #       !RST & !HRQ & !BPRN & BSY      " 4 ). Initial acquisition
                       #       !RST & !AEN & !BPRN & CBRQ     " 5 ). Hold if no other req's
                       #       !RST & AEN & !LOCK ;           " 6 ). Don't give if locked
         !HRQ          :=      !RST & !SYNC ;
         !SYNC         :=      !RST & !SRQ & !RD
                       #       !RST & !SRQ & !WR
                       #       !RST & !P2INT ;
         !ABEN         =       !AEN & MCE & !RST ;
         !BSY          =       !AEN ;
         BSY . OE      =       !AEN ;
         !CBRQ         =       AEN & !HRQ ;        "req. bus if don't have it and need it
         CBRQ . OE     =       AEN & !HRQ ;        "enab. output if requesting, else this
                                                   "pin is used as an input
TEST_VECTORS
( [BCLK, SRQ, RD, WR, BPRN, LOCK, P2INT, RST, MCE, BSY ] -> [SYNC, HRQ, AEN, ABEN, BSY,BREQ ,CBRQ] )
    [ C , H , H , H , L , H , H  , H , H , X ] -> [ H , H  , H , H , Z , H , Z ] ;
    [ C , H , H , H , L , H , H  , L , H , X ] -> [ H , H  , H , H , Z , H , Z ] ;
    [ C , L , H , H , L , H , H  , L , H , X ] -> [ H , H  , H , H , Z , H , Z ] ;
    [ C , L , L , H , L , H , H  , L , H , X ] -> [ L , H  , H , H , Z , H , Z ] ;
    [ C , L , L , H , L , H , H  , L , H , X ] -> [ L , L  , H , H , Z , L , L ] ;
    [ C , L , L , H , L , H , H  , L , H , X ] -> [ L , L  , L , L , L , H , Z ] ;
    [ C , H , H , H , L , H , H  , L , H , X ] -> [ H , L  , H , H , Z , L , L ] ;
    [ C , L , H , H , L , H , H  , L , H , X ] -> [ H , H  , L , L , L , H , Z ] ;

[ C , L , L , L , L , H , H  , L , H , X ] -> [ L , H  , H , H , Z , H , Z ] ;
    [ C , L , L , L , L , H , H  , L , H , X ] -> [ L , L  , H , H , Z , L , L ] ;
    [ C , H , L , L , L , H , H  , L , H , X ] -> [ H , L  , L , L , L , H , Z ] ;
    [ C , L , H , H , L , H , H  , L , H , X ] -> [ H , H  , H , H , Z , H , Z ] ;
    [ C , H , H , H , L , H , H  , L , H , X ] -> [ H , H  , H , H , Z , H , Z ] ;
    [ C , H , H , H , L , H , L  , L , L , X ] -> [ L , H  , H , H , Z , H , Z ] ;
END COM186_11 ;
```

FIG. 22

```
module _INTR186 ;                    flag ' -r2' , ' -t4' ;
title
'PAL16V8
20 PINS DIP
INTERRUPT GENERATOR CONTROL PLD.

" RefDes = U61 "

D5622B10      device 'P16V8C' ;

GND1, INT7, INT6, INT5, INT4, INT4, INT3, INT2, INT1, INT0, AEN_L
            pin 1,2,4,6,8,3,5,7,9,11 ;

P2INT, MBINT7, MBINT3, MBINT2, MBINT1, MBINT0
            pin 18, 16, 19, 17, 15, 13 ;

" declarations

H, L, X = 1, 0, .X. ;

equations           " modified 10 - 1 - 91 "
            !MBINT0 = !AEN_L & !INT0 ;

!MBINT7 = !AEN_L & !INT7 ;

!MBINT3 = !AEN_L & !INT3 ;

!MBINT2 = !AEN_L & !INT2 ;

!MBINT1 = !AEN_L & !INT1 ;

!P2INT = !INT0 # !INT1 # !INT2 # !INT3
                    # !INT7 ;

" READY GENERATOR PAL.
"
end_INTR186 ;
```

FIG. 23

COMMUNICATIONS CONTROLLER CENTRAL PROCESSING UNIT BOARD

This application is a continuation of application Ser. No. 07/853,402, filed Mar. 18, 1992 (now abandoned).

This application is related to U.S. patent application Ser. No. 07/584,933, entitled "PROPULSION CONTROL SYSTEM CENTRAL PROCESSING UNIT BOARD" filed Sep. 19, 1990, now abandoned, and U.S. patent application Ser. No. 07/686,927, entitled "PROPULSION CONTROL SYSTEM CENTRAL PROCESSING UNIT BOARD" filed Apr. 18, 1991, now U.S. Pat. No. 5,377,356, dated Dec. 27, 1994, both applications being by William F. Molyneaux, and hereby incorporated by reference.

This application is related to the following copending applications assigned to the same assignee as the present application which are hereby incorporated by reference:

Ser. No. 08/029,348, filed Mar. 10, 1993, now U.S. Pat. No. 5,404,465, dated Apr. 4, 1995, which is a continuation of Ser. No. 07/853,250, filed Mar. 18, 1992, now abandoned, by Michael R. Novakovich and Joseph S. Majewski, entitled "A METHOD AND APPARATUS FOR MONITORING AND SWITCHING OVER TO A BACK-UP BUS IN A REDUNDANT Train Line MONITOR SYSTEM";

Ser. No. 07/853,420, filed Mar. 19, 1992, now U.S. Pat. No. 5,353,413, dated Oct. 4, 1994, by Joseph S. Majewski, entitled "COLLISION HANDLING SYSTEM" filed Mar. 18, 1992 now abandoned;

Ser. No. 07/853,796, by Michael R. Novakovich and Joseph S. Majewski, entitled "A METHOD AND APPARATUS FOR CHRISTENING A Train Line MONITOR SYSTEM";

Ser. No. 07/853,540, filed Mar. 18, 1992, now U.S. Pat. No. 5,293, 632, dated Mar. 8, 1994, by Michael R. Novakovich and Richard D. Roberts, entitled "A METHOD AND APPARATUS FOR LOAD SHEDDING USING A Train Line MONITOR SYSTEM";

Ser. No. 07/853,960, filed Mar. 19, 1992, now U.S. Pat. No. 5,289,176, dated Feb. 22, 1994, by Michael R. Novakovich and Joseph S. Majewski, entitled "MULTI-MASTER RESOLUTION OF A SERIAL BUS";

Ser. No. 07/853,251, filed Mar. 18, 1992, now U.S. Pat. No. 5,317,751, dated May 31, 1994, by Michael R. Novakovich and Richard D. Roberts, entitled "A METHOD AND APPARATUS FOR PLACING A Train Line MONITOR SYSTEM IN A LAYUP MODE" filed;

Ser. No. 07/853,186, filed Mar. 18, 1992, by Henry J. Wesling, Michael R. Novakovich and Richard D. Roberts, entitled "REAL-TIME REMOTE SIGNAL MONITORING SYSTEM FOR COLLECTING REAL-TIME DATA ON SUBSYSTEM OPERATION";

Ser. No. 07/853,204, filed Mar. 18, 1992, now U.S. Pat. No. 5,265,832, dated Nov. 30, 1993, by Henry J. Wesling, Michael R. Novakovich and Richard D. Roberts, entitled "DISTRIBUTED PTU INTERFACE SYSTEM".

BACKGROUND OF THE INVENTION

1. Field of the Invention

The invention relates to the field of communications controller central processing unit (CPU) boards, and more particularly, to bus interface controller design in a CPU board based on an Intel 80186 CPU for systems for use with subway cars or the like.

2. Background Information

A communications control system for an advanced design subway train requires high-speed data acquisition and communication abilities. Such a system requires an ability to communicate with an on-board vehicle host computer and other communications controllers on other vehicles of the train, input/output to and from terminal devices, as well as an ability to communicate with and control slave input/output (I/O) control boards for controlling servo sub-systems of the subway vehicles. Such varied requirements have lead to compromises in communications bus design in the past, and thus limited overall system performance and efficiency when attempts to apply the existing designs to such a demanding environment have been made.

There are known a variety of buses, bus interfaces, and bus controllers in various microprocessor systems. One known industrial bus standard is the IEEE 796, or Multibus-I, and another is the IEEE 1296, or Multibus-II. "Multibus" is a trademark of the Intel Corporation for its unified bus architecture, which uses a single integrated bus for data, address and control information. The Intel Multibus architectures are used, for example, for connecting random access memory (RAM), read only memory (ROM) and input/output (I/O) boards in a microprocessor based system. The Multibus architecture provides for essentially five types of signals, including data, address, control, multilevel interrupt and timing signals. Modules connected to the bus act as either masters or slaves, masters having the ability to control the bus. Arbitration logic is provided for in the bus architecture to handle requests from multiple bus masters. Data rates on the bus are a factor of the master and slave devices data rates. The Intel type bus is generally configured with two connectors, the primary (P1) and the secondary (P2) connector. P1 connector signals include the address, data, control and interrupt signals, as well as the power supply. Most of the signals on the bus operate with negative logic, i.e., they are true when low.

The Multibus-I and Multibus-II busses are both usable with Intel IAPX 86 CPU based systems, for instance an 80186 CPU based system. Various Multibus-I and Multibus-II interfaces are known. A device attached to a Multibus-I interface has the capability to operate as a bus master and share a bus with other masters that reside on the bus. A device on the Multibus-I interface also has the capacity to generate and receive both vectored and nonvectored interrupts as well as read/write references to input/output (I/O) and memory space. Because of the bus protocol used on the Multibus-I, and other factors, it is generally suitable for communication with relatively slow slave I/O boards and the like. The Multibus-II, on the other hand, allows interprocessor communications via message passing, and is suitable for high-speed communications.

In typical Multibus-I designs, latching of data transceivers is required. Also, the existing conventional devices, for instance the Intel 8288 and 8289 bus controller and arbiter respectively, limit the achievable data throughput of the bus system. Improved performance and a marriage of Multibus-I and II capabilities in an integrated system are desirable.

A variety of serial busses and bus standards are also known, for example the RS232C and 485 serial standards. Manchester encoding is also a known technique in digital communications in which, for example, a logical "1" is represented by a bipolar coded signal of a positive pulse followed by a negative pulse, and a logical "0" by a bipolar coded signal of a negative pulse followed by a positive pulse. Manchester encoding provides for higher reliability, and is advantageous in certain applications where a line must pass through galvanic isolation devices because Manchester encoding eliminates D.C. voltage due to data logic levels on the communications line. Communication rates up to 500 Kbps over a half-duplex multidrop Manchester encoded high speed communications line are possible. Given the varied requirements of the subway train environment, the is a need for an integrated communications controller which can handle parallel communications with a host, and serial communications with are variety of devices having varying capabilities. To provide such an integrated communications controller, the conventional devices for arbitration and bus control are inadequate.

There are also know a variety of data communications standards, such as the ISO 4335 INTERNATIONAL STANDARD for data communications in the third edition dated 1987, which is hereby incorporated by reference.

An example of an application where it is contemplated the invention is particularly needed is in a Train Line monitor (TLM) system such as is shown in FIG. 3. The TLM system is a proprietary system of the assignee of the present invention which was developed in tandem with the present invention and which is used to control and monitor a multicar vehicle, e.g., a passenger or subway train, communication between cars being handled by a data packet communication network. The TLM is based in part on the ISO 4335 standard, mentioned above, and on the draft DIN 43322 GERMAN STANDARD specification for serial interfacing dated July 1988, which is hereby incorporated byreference. In this way, the various systems and sub-systems of the multi-car vehicle are monitored and controlled over the network.

Therefore, a communications controller CPU board which overcomes the above limitations and provides system design flexibility by having both Multibus-I and II interfaces, RS232 serial interfaces for terminal and other equipment, and a high speed Manchester encoded half duplex interface, on a single 80186 CPU board is proposed. The need is especially critical in real-time type applications, such as the Train Line monitor (TLM) system described above, where delays to communication can have serious consequences to the proper operation of the system.

SUMMARY OF THE INVENTION

In order to solve the above-mentioned problems the present invention provides the following novel features and advantages.

The Communication Controller CPU board according to an embodiment of the invention, is a single board 80C186 CPU based system for operation in the Multibus-II (MB-II) environment. The board provides the required intelligence for the supervision of a high-speed serial data communication system for on-board and between vehicle communications in rapid transit systems.

The board takes advantage of the Multibus-II system architecture in providing a high-speed interface to a Parallel System Bus (PSB) which is optimized for interprocessor communication and data movement with a host system.

In addition to the Multibus-II interface, the Communication Controller supports a proprietary P2 bus interface of the assignee of the present invention which provides a standard interface for expanding the on-board resources of a single board computer. The P2 bus is a modified version of the IEEE 796 (Multibus-I) bus specification. It provides a multidrop master-slave RS485 serial bus for communications with intelligent subsystems on-board a vehicle.

The communications controller CPU board is a 6 U (double height) Eurocard form factor. The board is designed to meet all the requirements of the mechanical section of the IEEE 1296 specification with the exception of the board depth dimension which has been reduced from 220 mm to 160 mm. It has two 96-pin connectors labeled P1 and P2 on the rear end of the board. P1 provides the mechanical and electrical connections between the board and the Parallel System Bus (Multibus-II) architecture. P2 provides mechanical and electrical interface between the board and the P2 Vehicle Bus (Multibus-I, IEEE 796, RS485 serial bus).

The board also provides interface support to the RS485 standard for an inter-vehicle Train Bus with a high speed Manchester encoded half duplex interface, and to the RS232C standard for certain on-board sub-systems, terminal devices, test equipment, and the like.

The IEEE 796 Vehicle Bus interface advantageously runs synchronous with the 80186 CPU clock at 10 MHz which reduces the amount of complex logic required. The 80186 CPU communications board according to the invention includes novel custom designed programmed logic devices (PLD's or PAL's) which eliminate the drawbacks associated with the use of devices such as 8288 type bus controllers, 8289 type bus arbiters, and latching data transceivers, and additionally provide a high degree of reliability due to component reduction. The programmed logic devices implement state machine control of the communications operations.

Synchronous Data Link Control (SDLC) protocol is supported on the Vehicle Bus and High-level Data Link Control (HDLC) protocol is supported on the Train Bus according to one embodiment of the invention.

In order to provide a robust system, interfaces for redundant Train Busses, a primary and a backup Train Bus, are provided for, the Train Busses facilitating communication between vehicles in the train, and each of these Train Bus interfaces provides for a main channel and an auxiliary channel.

BRIEF DESCRIPTION OF THE DRAWINGS

Further advantages and features will become apparent from the detailed description below taken with the drawings in which:

FIG. 13 shows in tabular form the specifications, including state transition equations, for U6 the power PAL of FIG. 5 according to a preferred embodiment of the invention;

FIGS. 14a–c shows in tabular form the specifications, including state transition equations, for U56 the address decoder PAL of FIG. 6 according to a preferred embodiment of the invention;

FIG. 15 shows in tabular form the specifications, including state transition equations, for U53 the memory decoder PAL of FIG. 6 according to a preferred embodiment of the invention;

FIG. 16 shows in tabular form the specifications, including state transition equations, for U49 the I/O decoder PAL of FIG. 6 according to a preferred embodiment of the invention;

FIG. 17 shows in tabular form the specifications, including state transition equations, for U48 the decoder PAL of FIG. 6 according to a preferred embodiment of the invention;

FIG. 18 shows in tabular form the specifications, including state transition equations, for U46 the 8530 control PAL of FIG. 8 according to a preferred embodiment of the invention;

FIG. 19 shows in tabular form the specifications, including state transition equations, for U59 the RTS PAL of FIG. 8 according to a preferred embodiment of the invention;

FIG. 20 shows in tabular form the specifications, including state transition equations, for U45 the interrupt wait state generator and slave interrupt decoder PAL of FIG. 11 according to a preferred embodiment of the invention;

FIGS. 21a–c show in tabular form the specifications, including state transition equations, for U60 the Multibus-I control lines PAL of FIG. 12 according to a preferred embodiment of the invention;

FIG. 22 shows in tabular form the specifications, including state transition equations, for U54 the Multibus-I arbiter PAL of FIG. 12 according to a preferred embodiment of the invention; and FIG. 23 shows in tabular form the specifications, including state transition equations, for U61 the interrupt generator control (RDY GEN) PAL of FIG. 12 according to a preferred embodiment of the invention.

DETAILED DESCRIPTION OF THE PREFERRED EMBODIMENTS

Figure 1:
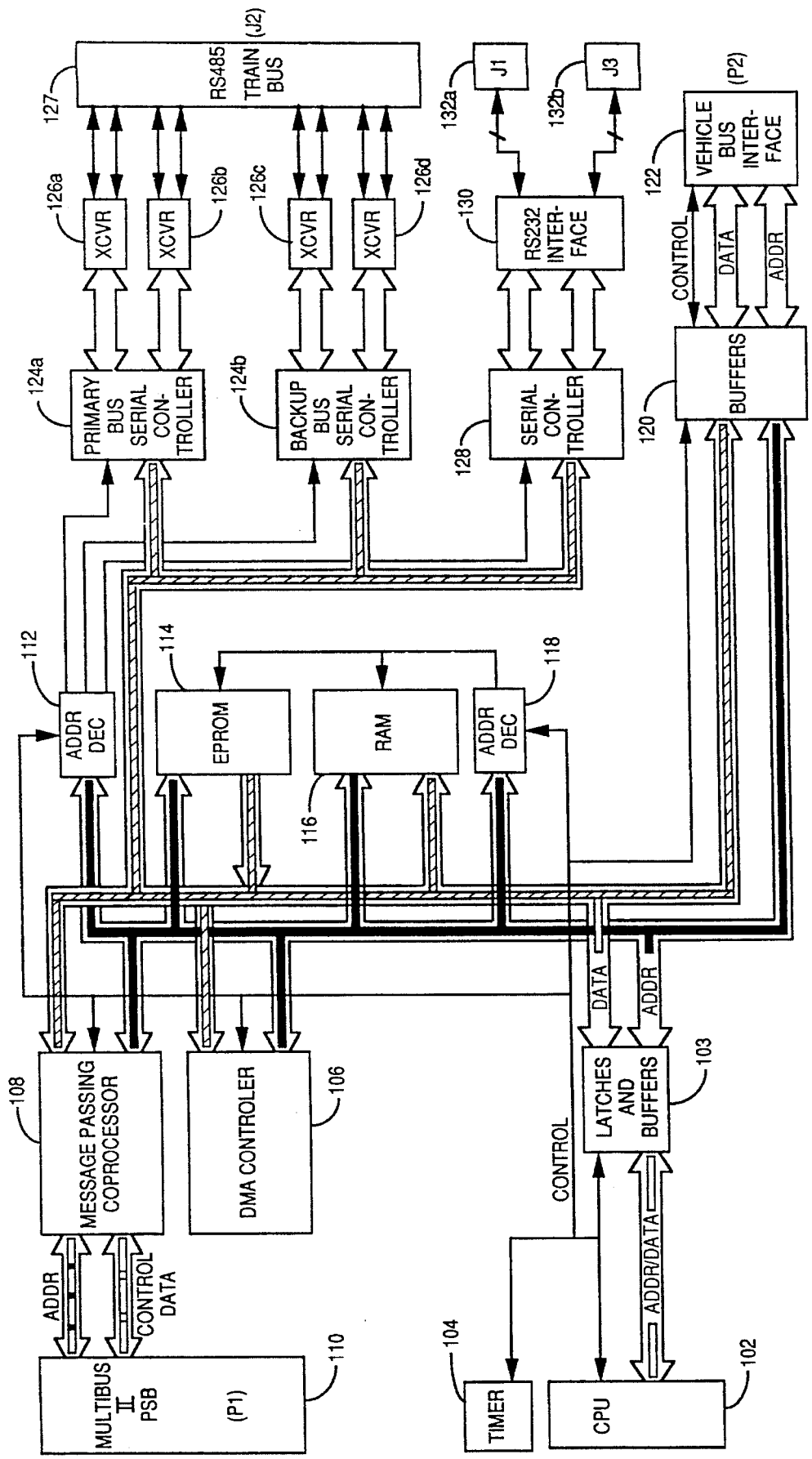
FIG. 1 is a block diagram of an embodiment of the communications controller board according to the invention.

Referring to FIG. 1, the communication controller CPU board according to an embodiment of the invention is made up of the following functional blocks. In a preferred embodiment, CPU 102 is an 80C186 CPU connected to associated address and data latches and buffers 103 providing, with address decoders 112 and 118, direct addressing of up to 1M bytes of EPROM 114 and RAM 116 in the memory space and up to 64K bytes of peripheral I/O space.

A local 16-bit data bus provides a data path between the CPU 102, the on-board memory 114 and 116 and peripherals, e.g., DMA controller 106, Message Passing Coprocessor 108 (and thereby to the Parallel System bus, e.g., Multibus-II 110), serial controllers 124a, 124b and 128, and, buffered by buffers 120, the P2 Vehicle Bus Interface 122.

Multibus-II 110 interconnect space support for identification of board type and board configuration is provided by an 8751 microcontroller, as will be described in more detail with reference to FIG. 2a, below.

Serial communication control supporting RS485 and RS232C standards is provided by serial controllers 124a–b and 128, respectively. Vehicle Bus interface 122 also includes serial bus controller circuitry supporting RS485.

Advantageously, the communication controller according to the present invention includes the following features. The Intel 80C186-12 CPU 102 is a high integration microprocessor with the following integrated functions: clock generator, local bus controller, two independent DMA channels, three programmable 16-bit timers, programmable interrupt controller, programmable wait state generator, and programmable memory and peripheral chip select logic.

The CPU board according to a preferred embodiment of the invention is designed to provide sockets for up to 1M byte of EPROM 114 and sockets for up to 256K bytes of SRAM 116.

The Multibus-II (MB-II) interface 110 will now be described. The MB-II interface is implemented via the message passing coprocessor (MPC) 108 and associated address, data, and control line buffers. The MPC 108 implements the interface according to the Intel Multibus-II BUS ARCHITECTURE SPECIFICATION HANDBOOK, hereby incorporated by reference. The MPC 108 performs several functions which are important to the Parallel System Bus (PSB) 110, i.e., MB-II interface. The MPC 108 arbitrates ownership of the MB-II interface; generates and checks the address, data and command lines for the MB-II interface; generates and decodes messages on the MB-II interface; provides access to the local interconnect space (using the 8751 microcontroller) from either the local CPU 102 or another MB-II bus master; and provides the path for the data and controls the signals and address paths to the MB-II interface (the address is provided externally).

Figure 2A:
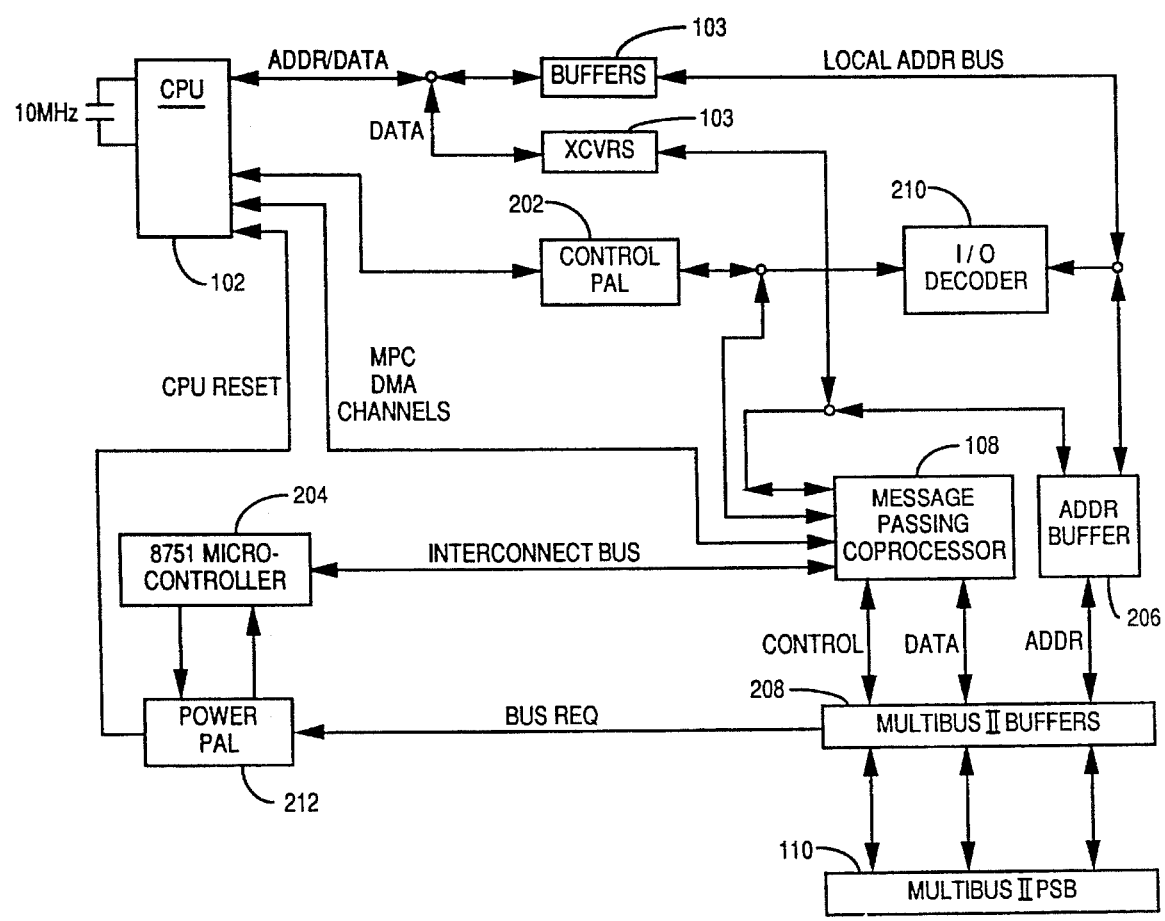
FIG. 2a is a block diagram showing the parallel system bus (PSB) modified Multibus-II communication section in more detail.

Referring now to FIG. 2a which is a more detailed block diagram of the MB-II section of the communications controller CPU board according to the invention, initialization of the interconnect space area is performed via the interconnect device, in a preferred embodiment an Intel 8751 microcontroller, 204. This microcontroller 204 holds a standardized set of read/write and read-only registers called the interconnect registers. The 80C186 CPU 102, or another CPU on the MB-II bus 110, may access the interconnect registers in microcontroller 204 through the MPC 108. The MPC 108 is the only component of the communication controller board that can directly access the interconnect register within the 8751 microcontroller 204. The interconnect registers allow dynamic configuration of I/O and memory, remote diagnostic testing and reporting, and board identification.

A 16-bit data interface and a 32-bit message passing interface to the MB-II 110 are provided, allowing the board to access up to four gigabytes of memory on the MB-II bus 110. An 8-bit interconnect space support for identification of board type, and for diagnostic handshake and status is also implemented.

The communication controller CPU board interfaces to the MB-II bus 110 through buffers 208. The board thereby acts as a bus controller and provides a 20-bit address bus and a 16-bit data bus.

The Multibus-II message passing coprocessor 108 is designed to function as a Multibus-II bus controller. It has a bus interface and several transmit and receive FIFO's (first-in first-out registers) which are used to pass messages over the Multibus-II bus 110. The interconnect device 204 provides a convenient way to augment the Multibus-II message passing coprocessor 108 to interface with the Multibus-II bus 110, as described above.

Power PAL 212 is interconnected to the microcontroller 204, the Multibus-II buffers 208 via the bus request signal, and to the CPU 102. The power PAL 212 implements state device control functions as specified in tabular form in FIG. 13, described later.

Figure 2B:
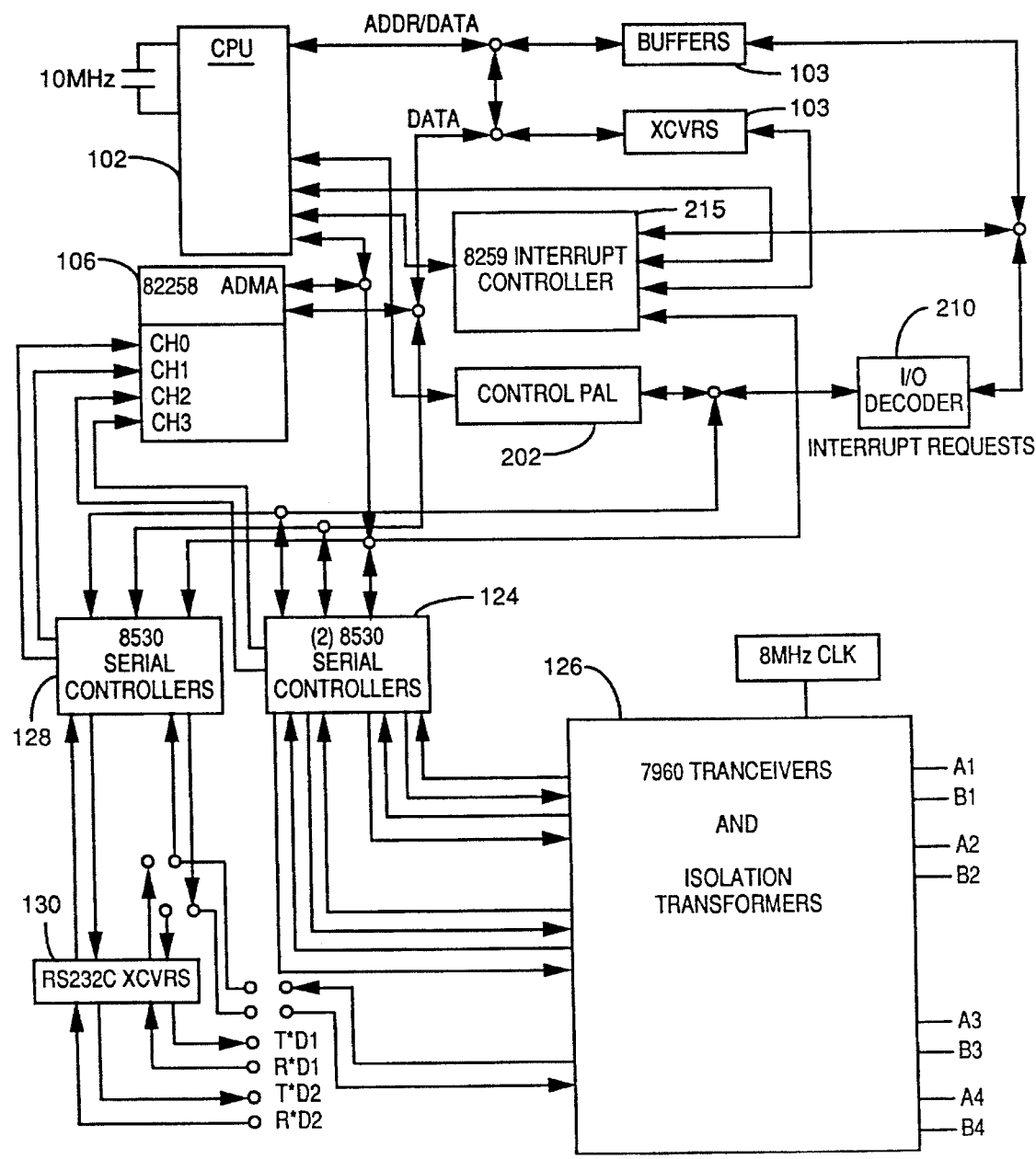
FIG. 2b is a block diagram showing the RS232C and the RS485, Manchester encoded, Train Bus interface sections of the board in more detail.

Referring now to FIG. 2b which is a more detailed block diagram of the Train Bus and RS232C serial interface sections of the communications controller CPU board, the I/O functions will now be described. An 8259 interrupt controller 215 is shown connected to the CPU 102 and operates to interrupt the CPU 102 when I/O is requested by one of the 8530 serial controllers 124 and 128.

An 82258 direct memory access (DMA) controller 106 includes four independent channels CH0 to CH3 to service the 8530 high speed serial controllers 124 and 128. The 8530 serial communications controllers (SCCs) 124 and 128 each have two independent channels. The 8530 SCCs 124 and 128 provide for serial input and output (I/O) with the ADMA 106.

In a preferred embodiment, there are three 8530 SCCs on the communication controller CPU board, two of them being used in order to provide redundant Train Busses in the section depicted in FIG. 2b. The Intel 8530 SCC is a dual channel multi-protocol data communication peripheral with a variety of sophisticated internal functions including one baud rate generator per channel and a digital phase-locked loop. The 8530 SCC device supports HDLC/SDLC modes with eight bit address compare. It can generate and check 16-bit cyclic redundancy check (CRC). Interrupts are supported in the 8530 device via an internal programmable interrupt controller which is cascaded to the master 8259 interrupt controller 215. High-speed data transfers via direct memory access (DMA) are supported through a pair of Request/Acknowledge signals for each receiver.

Four of the six available channels in the preferred three 8530 SCCs are used to manage all the transactions over dual channel primary and a backup Train Busses. The Train Bus according to the Train Line monitor system (TLM) developed in conjunction with the present invention uses the RS485 standard with voltage isolation between users, requires that High Level Data Link Control (HDLC) protocol be used and requires that the data be Manchester II encoded. Therefore, transceivers 126(*a–d*) are, for example, Advanced Micro Devices AM7960 Coded Data Transceivers. The 7960 is a combined Manchester encoder/decoder and transceiver. Offboard isolation transformers are also provided (not shown) to give the required voltage isolation. The AM7960 is optimized to drive off-board isolation transformers, so no additional interfacing is required, and provision for termination resistors is also provided.

Both serial channels of the two 8530's 124 interface to the Train Bus through isolation transformers (not shown). The main Train Bus channel may include a 24 VDC isolated power supply that can be enabled or disabled by the CPU board via a bit on a latch port on the Vehicle Bus interface. It will only be enabled on the Train Line Monitor cradle for the vehicle that is the Train Bus master. This is to allow the RS485 level signals to ride with a 24 volt offset level to give some drive capability to get the signals through coupler connections between cars.

A Terminal Interface is also provided on the board by the RS232C transceivers 130. These make two RS232C serial ports available on the communication controller CPU board. Each port provides at least three wires: receive, transmit and signal ground (not shown) for interface with a terminal device. The transceivers 130 handle all the standard baud rates under control of the 8530 controller 128 associated therewith.

Referring again to FIG. 1, the Vehicle Bus (P2 or BITBUS) interface 122 is shown. The interface 122 communicates through buffers 120 with the data and address busses, and control lines as shown, and thereby with rest of the CPU board. The interface 122 provides one BITBUS channel to the Vehicle Bus on-board the vehicle. This interface 122 will be used as the master node for the Vehicle Bus of a particular car on which the communications controller board is located.

Figure 2C:
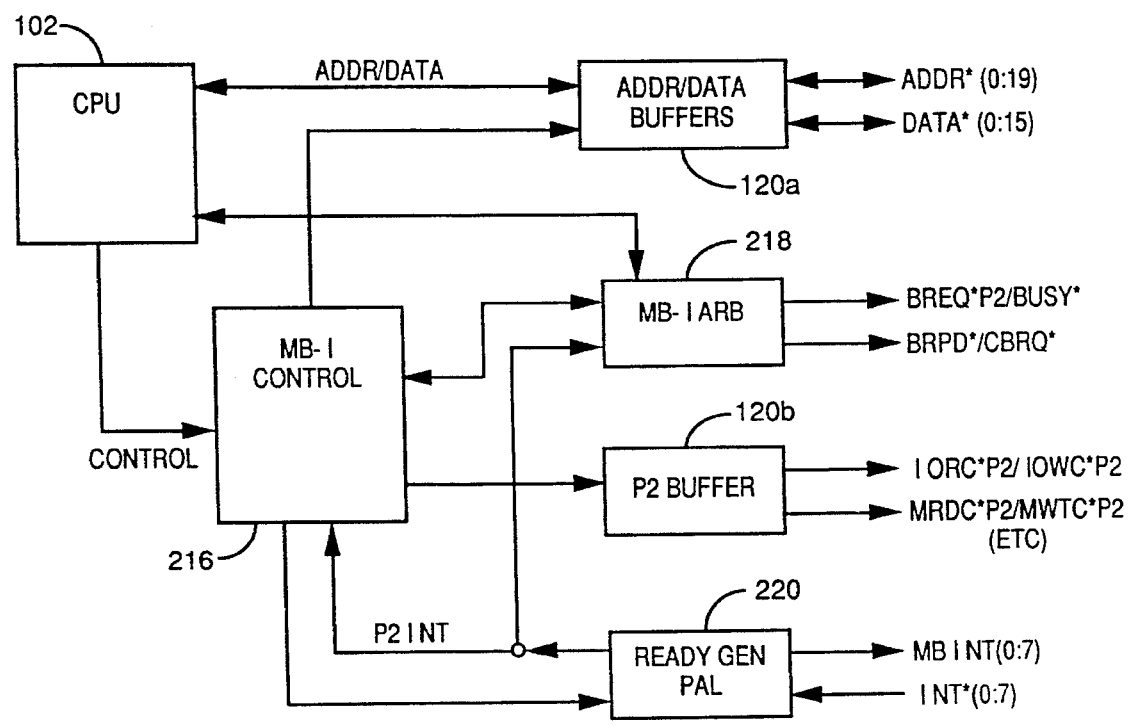
FIG. 2c is a block diagram illustrating the MB-I Vehicle Bus interface section in more detail.

Referring now to FIG. 2c, a block diagram of the Vehicle Bus interface 122 hardware is shown. It includes MB-I control PAL 216, the receive and transmit data and address latches 120a, and P2 signal buffer 120b, ready generator PAL 220, and MB-I arbiter PAL 218 interconnected as shown. The associated state transition equations for these PAL's are presented in FIGS. 21 to 23, described later. This arrangement greatly reduces the complexity and chip count, and improves the efficiency of conventional Multibus-I control schemes. At this point in the discussion, is would be appropriate to describe the environment in which it is contemplated the present invention has particular applicability, i.e., the proprietary train line monitor system (TLM) of the assignee of the present invention.

Figure 3:
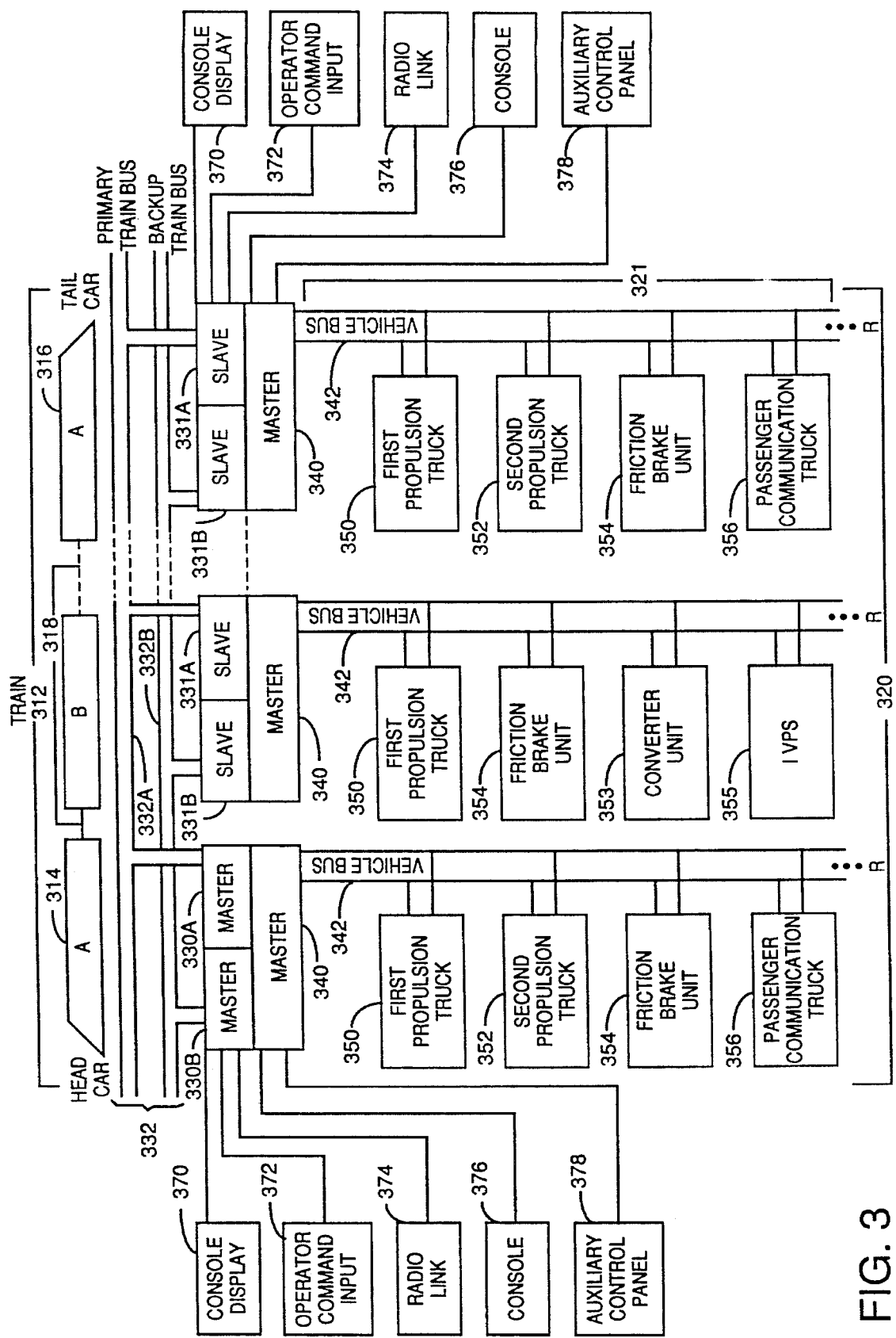
FIG. 3 is a diagram showing an embodiment of the Train Line monitor system (TLM) in which the present invention finds particular use.

Referring now to FIG. 3, shown is the Train Line Monitor System (TMS) in which the present invention may advantageously be used. FIG. 3 shows a representative train 312 with a head car 314, a tail car 316, and middle cars 318. Only one middle car 318 is shown, however a typical commuter train may have from one to ten middle cars 318 having essentially the same equipment on board.

Head car 314 has redundant Train Bus masters including primary Train Bus master 330A and backup Train Bus master 330B as shown. Primary Train Bus master 330A serves as a master node for primary Train Bus 332A and backup Train Bus master 330B serves as a master node for backup Train Bus 332B. Primary Train Bus 332A and backup Train Bus 332B make up redundant Train Buses 332. In addition, middle cars 318 and tail car 316 each have redundant Train Bus slaves including primary Train Bus slave 331A and backup Train Bus slave 331B.

Primary Train Bus 332A has a main and an auxiliary channel. Similarly, back-up Train Bus 332B has a main and an auxiliary channel. Communications on the auxiliary channels only occurs under certain circumstances with primary and back-up slave nodes on a tail car as described in commonly owned and concurrently filed copending patent application entitled "A Method and Apparatus For Christening a Train Line Monitor System," attorney docket number AWA-378, which has been incorporated by reference.

Each car 314, 316 and 318 has a Vehicle Bus master 340 and a Vehicle Bus 342 which are used in the TLM system 320 as means for communicating with the various subsystems. As used herein, TLM 320 comprehends redundant Train Bus masters 330, redundant Train Bus slaves 331, redundant Train Busses 332, Vehicle Bus masters 340, Vehicle Busses 342 and intelligent sub-system interfaces to the Vehicle Bus 342 (not separately shown).

Examples of subsystems which may be found on head car 314 include first propulsion truck 350, second propulsion truck 352, friction brake unit 354, and passenger communication unit 356 as shown. Other subsystems, not shown for ease of illustration, may include a doors control unit, a heating, ventilation and air conditioning unit (HVAC), a lighting unit, etc.

Redundant Train Bus masters 330A, 330B or redundant Train Bus slaves 331A, 331B, together with the respective Vehicle Bus master 340, can be embodied in separate CPUs or a single CPU with a multitasking operating system and 3 separate I/O ports. Each of the Train Buses 332A and 332B, with its master and slave devices, represent an HDLC packet communications network for the purposes of the present invention according to a modified ISO 4335 HDLC data communications and DIN 43322 serial interface standards.

Middle cars 318 can have the same subsystems as head car 314 but they typically would not have a second propulsion truck 352 but would have a convertor unit 353 and an intermediate voltage power supply (IVPS) 355. Tail car 316 has the same subsystems as head car 314. The following discussion regarding Train Bus master 330A applies to Train Bus master 330B as well.

Head car 314 has, in addition to redundant Train Bus masters 330A and 330B, a console display 370, operator command input unit 372, radio link unit 374, console 376 and auxiliary control panel 378, which facilitate control and communications by a train operator.

Referring to head car 314, Vehicle Bus master 340 communicates with one of redundant Train Bus masters 330A and 330B which in turn communicate with the rest of TLM system 320 via one of the primary Train Bus 332A and backup Train Bus 332B, respectively. Vehicle Bus 342 has predetermined nodes and therefore does not have to deal with such considerations as geographic addressing or car orientation. Vehicle Bus 342 is, in a preferred embodiment, an Intel BITBUS in which case the subsystems have BITBUS interfaces.

Vehicle Bus master 340 and the various subsystems 350–356, etc., operate under standard master-slave communications protocols, such as Synchronous Data Link Control (SDLC), using a multidrop RS485 serial link. Vehicle Bus master 340, Vehicle Bus 342 and the various vehicle subsystems comprise a master-slave communication subsystem 321.

The above described TLM system is advantageously used to control and monitor in real-time a multi-car vehicle, communications between cars being handled by the exchange of packets over the communications network.

The TLM system 320 is connected to first and second propulsion trucks 350 and 352 by Vehicle Bus 342. The TLM system 320 can transmit test commands, propulsion commands, real-time clock synchronization information, etc., to the first and second propulsion trucks 350 and 352. First and second propulsion trucks 350 and 352 respond by transmitting back test results and status information over the TLM system 320.

In a like manner, the TLM system 320 is connected to convertor unit 353 by the Vehicle Bus 342. The TLM system 320 can transmit test commands and convertor control commands such as convertor on/off, load shedding commands and realtime clock synchronization information, etc., to the convertor unit 353. The convertor unit 353 responds by transmitting back test results and status information to TLM system 320.

The TLM system 320 is connected to a friction brake unit 354 by the Vehicle Bus 342. The TLM system 320 transmits test commands, braking commands and real-time clock synchronization information, etc., to the friction brake unit 354. The friction brake unit 354 responds by transmitting back test results and status information to TLM system 320.

The TLM system 320 is also connected to an intermediate voltage power supply (IVPS) 355 and passenger communication unit 356 by the Vehicle Bus 342. The IVPS converts 600 volt power into 300 volts which is necessary since some of the subsystems, such as the friction brake unit 354, use 300 volt power. The TLM system 320 transmits test commands, IVPS control commands, such as IVPS on/off commands, and real-time clock synchronization information, etc., to IVPS 355 and the IVPS 355 responds by transmitting back test results and status information to TLM system 320. The TLM system 320 transmits test commands, real-time clock synchronization information, car serial number, relative car position, car orientation information, zero speed commands, door open and close commands, and odometer or speed signals, etc., to passenger communication unit 356. The passenger communication unit 356 responds by transmitting back test results and status information to TLM system 320.

The TLM system 320 is also connected to other subsystems (not shown), such as a door control unit, a heating, ventilation and air conditioning (HVAC) unit, and a lighting unit, by the Vehicle Bus 342. TLM system 320 transmits test commands, status requests, real-time clock synchronization information, car orientation information, etc., to the units. The units respond by transmitting back test results and status information.

The operator command input unit 372 of head car 314 may be a waterproof piezo keyboard having piezo keys integrated into a 5 mm aluminum plate and operated through a 0.8 mm aluminum cover plate. Console display 370 may be an electroluminescent self-illuminated screen. Console 376 is a state driven device having a "power-up" state and a "operating" state.

If a car in train 312 is keyed-up, then operator console 376 is enabled and this car becomes the head car with redundant Train Bus masters 330A, 330B. At start-up, console display 370 displays results of power-up self-test. Then, TLM system 320 enters an "operating state." Console display 370 then displays a simple status message (OK, Warning, Failed or Non-existent) for each subsystem 350–364 on each car of train 312. The operator can use operator command input 372 to access diagnostic information on any of the subsystems 321 on any of the cars of train 312. A portable test unit (PTU) has the ability to access any of the information available to the operator.

Information can also be transmitted or received by a wayside station using radio link 374 thereby reporting diagnostic alarms and acting as a diagnostic data dump at a specific point along the wayside.

In the TLM 320 shown in FIG. 3 in which the invention has particular usefulness, the Train Bus 332 is based on the draft DIN 43322 GERMAN STANDARD specification dated July 1988 developed especially for the railroad environment, which has been hereby incorporated by reference. It is configured as a master-slave communication system that uses a multi-drop RS485 serial link. The serial data is Manchester encoded for higher reliability. This also allows it to pass through the galvanic isolation between cars. Train Bus messages between vehicles are encoded into standard high level data link control (HDLC) data packets. During operation, the HDLC-encoded messages and protocol ensure data integrity and provide a way to request data retransmission if necessary.

Each Vehicle Bus 342 is based on the well known industry standard Intel BITBUS, the subject matter of which is hereby incorporated by reference. BITBUS is a master-slave communication system that uses a multidrop RS485 serial link. This provides a simple, expandable system to which all systems on the vehicle can easily interface. BITBUS messages are transmitted as synchronous data link control (SDLC) data packets. During operation, the SDLC-encoded messages and protocol ensure data integrity and provide a way to request data retransmission if necessary.

Referring now to FIGS. 4 to 12, a schematic representation of the major components of a preferred embodiment of the communications controller board according to the invention will be described.

Figure 4A:
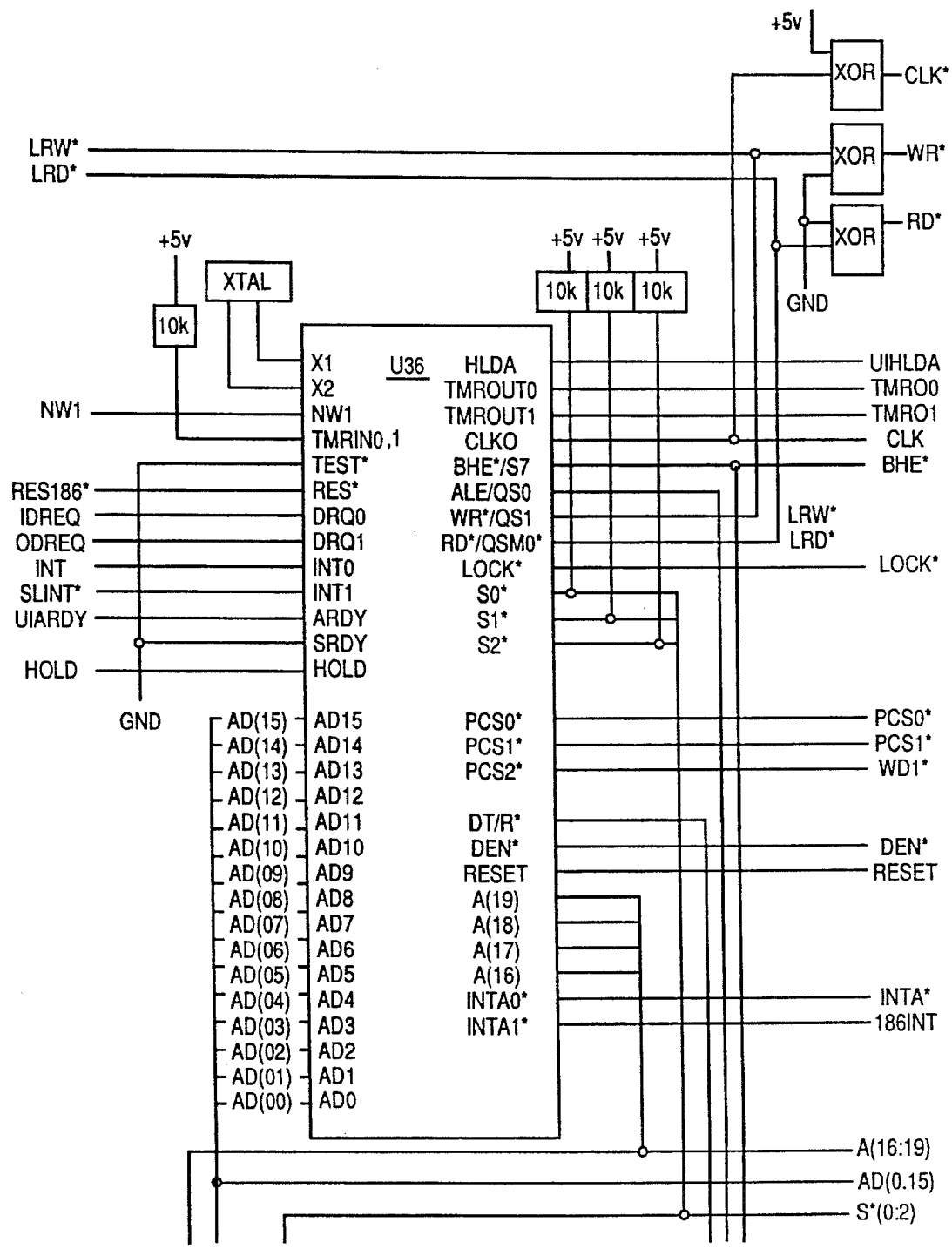
FIGS. 4a, 4b and 4c illustrate 80186 CPU (U36) and associated buffers/latches and logic, including the major components and signals according to the preferred embodiment of the invention.
Figure 4B:
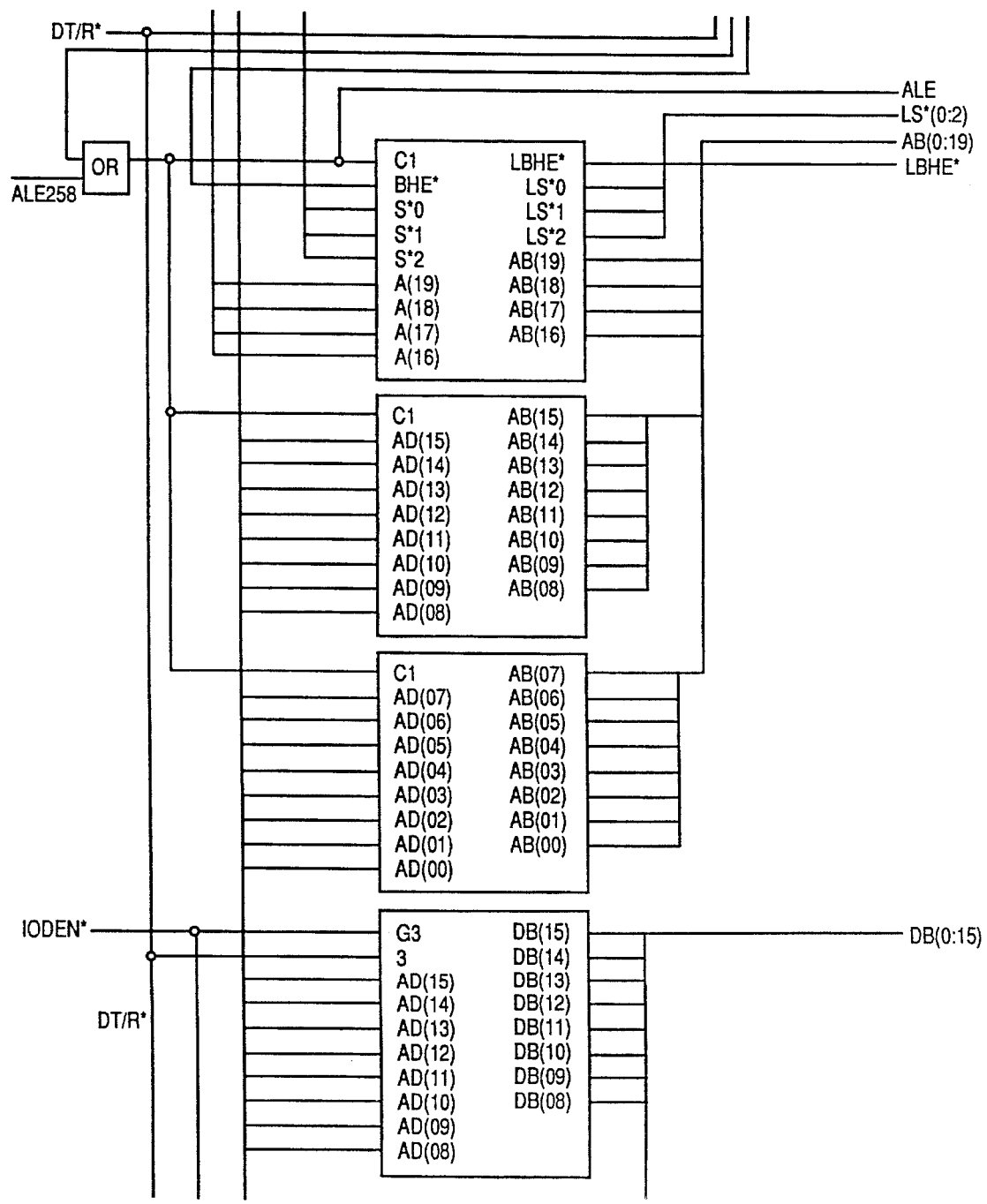
Figure 4C:
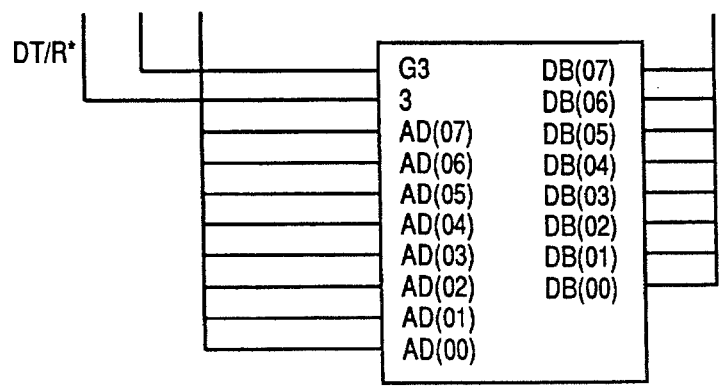
Figure 4:
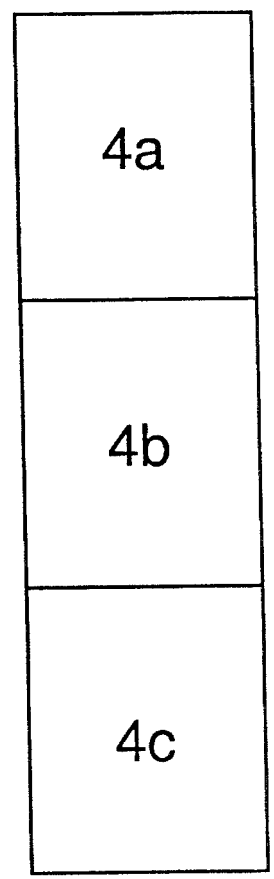
FIG. 4 illustrates how FIGS. 4a, 4b and 4c relate.

FIG. 4 shows how FIGS. 4a, 4b and 4c go together. In FIGS. 4a–c, the 80186 central processing unit (CPU) U36 is shown with associated signals, buffers/latches and logic devices. The CPU U36 communicates with the rest of the system by means of various control, address and data lines as shown. As is well know, the 80186 CPU U36 uses 16 multiplexed address/data lines AD0 to AD15 and uses the ALE signal (Address Latch Enable) to control whether address or data bits are enabled on these lines. The latches shown in FIG. 4b, serve to "demultiplex" the address and data lines as shown to provide a 16 bit data bus DB and, together with the 4 dedicated address lines A16 to A19 from the 80186, a 20 bit address bus AB. Various control and timing signals are output from and received by the 80186 CPU U36 as illustrated.

The box labelled XTAL represents a piezo-electric crystal and associated capacitors which connect to lines X1 and X2 to provide for the speed at which the CPU U36 operates, in a preferred embodiment, at about 10 MHz. The boxes labelled 10k represent pull-up resistors. The boxes labelled XOR represent exclusive-OR logic and provide the clock (CLK*), write (WR*) and read (RD*) signals as shown. The box labelled OR represents an OR-logic device and is shown in FIG. 4b receiving both the 80186 ALE signal and a signal ALE258, so that either signal strobes the latches to thereby demultiplex the address/data signals. The ALE258 signal comes from the direct memory access (DMA) device, U37 of FIG. 10, and is used during DMA transfers to latch the addresses.

Sixteen bit data bus DB(0:15) is provided by the two latches in FIGS. 4b and 4c as shown. The IODEN* signal enables these latches and is generated by programmed logic device decoder PAL U48 of FIG. 6 upon receipt of signals from the 80186 CPU U36, the programmed logic device I/O decoder U49 device of FIG. 6, and the programmed logic device interrupt wait state generator & slave interrupt decoder PAL U45 of FIG. 11.

Figure 5:
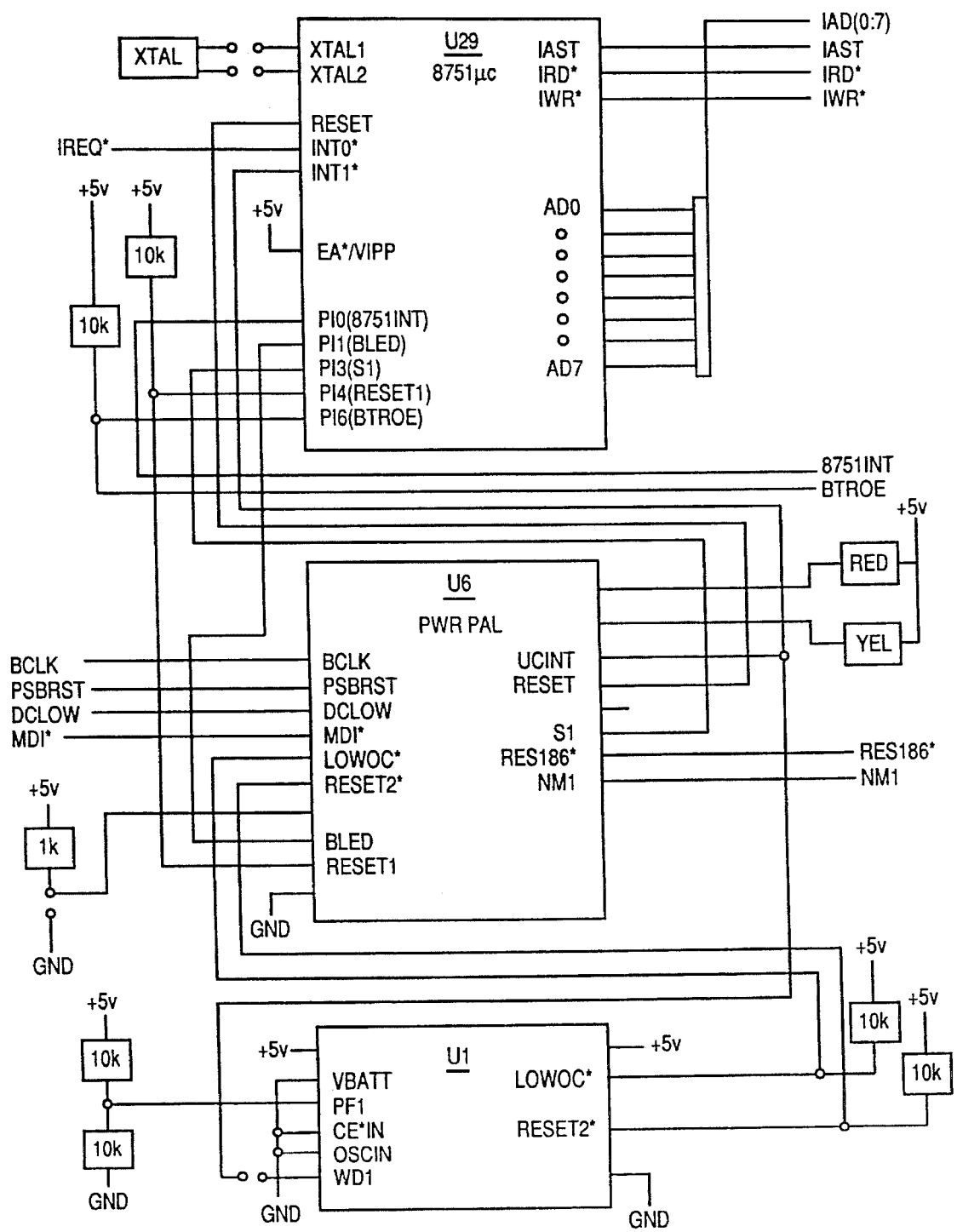
FIG. 5 illustrates schematically the interconnect device U29 an Intel 8751 microcontroller, power PAL U6 and microprocessor supervisory circuits U1, which form part of the modified MB-II parallel system bus (PSB) according to a preferred embodiment of the invention.

Referring now to FIG. 5, illustrated schematically are the interconnect device U29 an Intel 8751 microcontroller, programmed logic device power PAL U6, and microprocessor supervisory circuits U1, along with associated signals, which form part of the modified MB-II Parallel System Bus (PSB) according to a preferred embodiment of the invention. As was mentioned above, the U29 8751 microcontroller holds a standardized set of read/write and read-only registers called the interconnect registers. The 80C186 CPU U36, or another CPU on the MB-II bus, may access the interconnect registers in microcontroller U29 through the MPC 108. The MPC 108 is the only component of the communication controller board that can directly access the interconnect register within the 8751 microcontroller U29.

The interconnect registers allow dynamic configuration of I/O and memory, remote diagnostic testing and reporting, and board identification. The interconnect space is implemented as an EPROM (electronically programmable read only memory) area where board identification information is stored. The power PAL U6 is programmed to accept voltage-low input conditions and power-up reset timing inputs from the Multibus-II interface or device U1.

Figure 6:
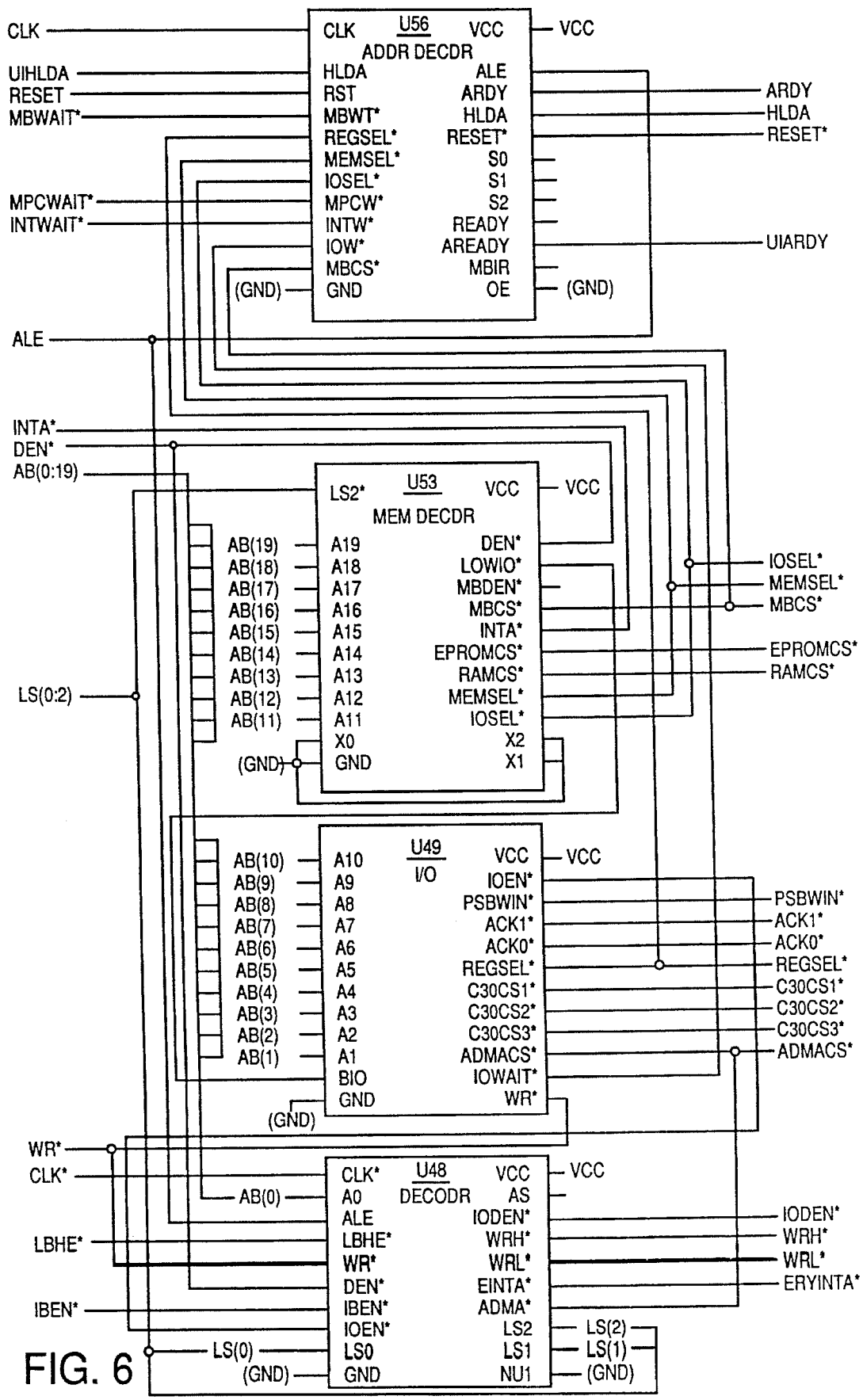
FIG. 6 illustrates schematically address decoder PAL U56, memory decoder PAL U53, input output (I/O) decoder U49 and decoder U48 according to a preferred embodiment of the invention.

Referring now to FIG. 6, illustrated schematically are address decoder PAL U56, memory decoder PAL U53, input output (I/O) decoder U49 and decoder U48, and associated signals, according to a preferred embodiment of the invention.

Figure 7:
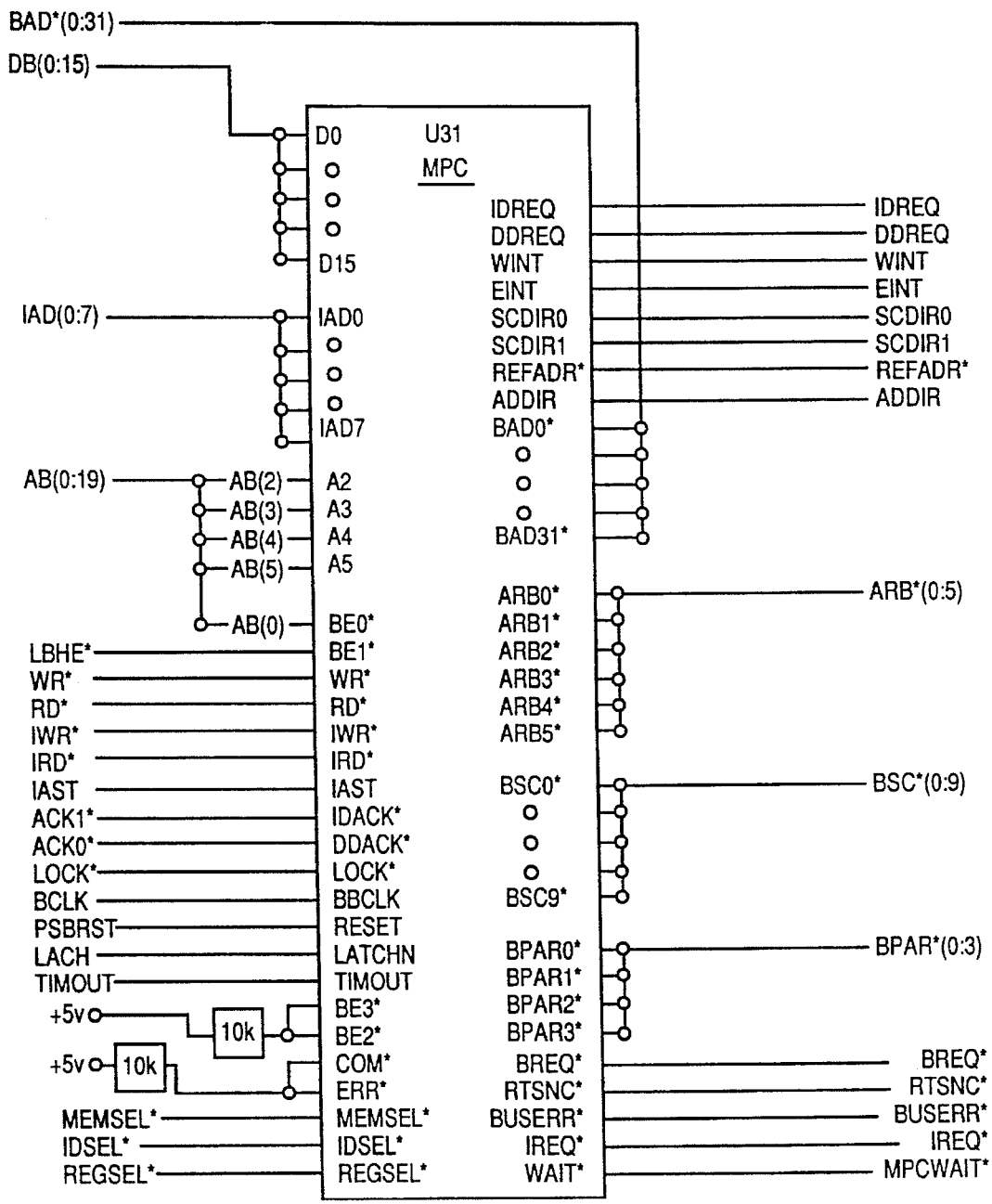
FIG. 7 illustrates schematically message passing coprocessor (MPC) U31 and the major signals associated therewith according to a preferred embodiment of the invention.

Referring now to FIG. 7, illustrated schematically is message passing coprocessor (MPC) U31 and the major signals associated therewith according to a preferred embodiment of the invention. As described earlier, the MPC U31 implements the parallel systems bus (PSB) which is a modified Multibus-II bus. The MPC U31 is, in the preferred embodiment, an Intel MPC 82389, or its equivalent. The multifunction peripheral device U31 includes an on-board a direct memory access controller, fifteen levels of interrupt, and a wait state generator. As mentioned above with respect to FIG. 2a, the MPC U31 connects to an interconnect device U29 of FIG. 5, which in a preferred embodiment is an Intel 8751 microcontroller, or its equivalent, via an interconnect bus including control and address/data lines. The MPC U31 is also connected to the PSB Multibus-II bus (IEEE 1296 BUS) via Multibus-II buffers 208 using control, address and data lines. The Multibus-II buffers are also connected to the interconnect device U29 by bus request control lines.

The Multibus-II message passing coprocessor U31 is designed to function as a Multibus-II controller. It has a bus interface and several transmit and receive FIFO's (first-in first-out registers) which may be used to pass messages over the Multibus-II PSB bus. The 8751 interconnect device U29 provides a convenient way to augment the Multibus-II message passing coprocessor U31 to interface with the Multibus-II PSB bus.

Figure 8:
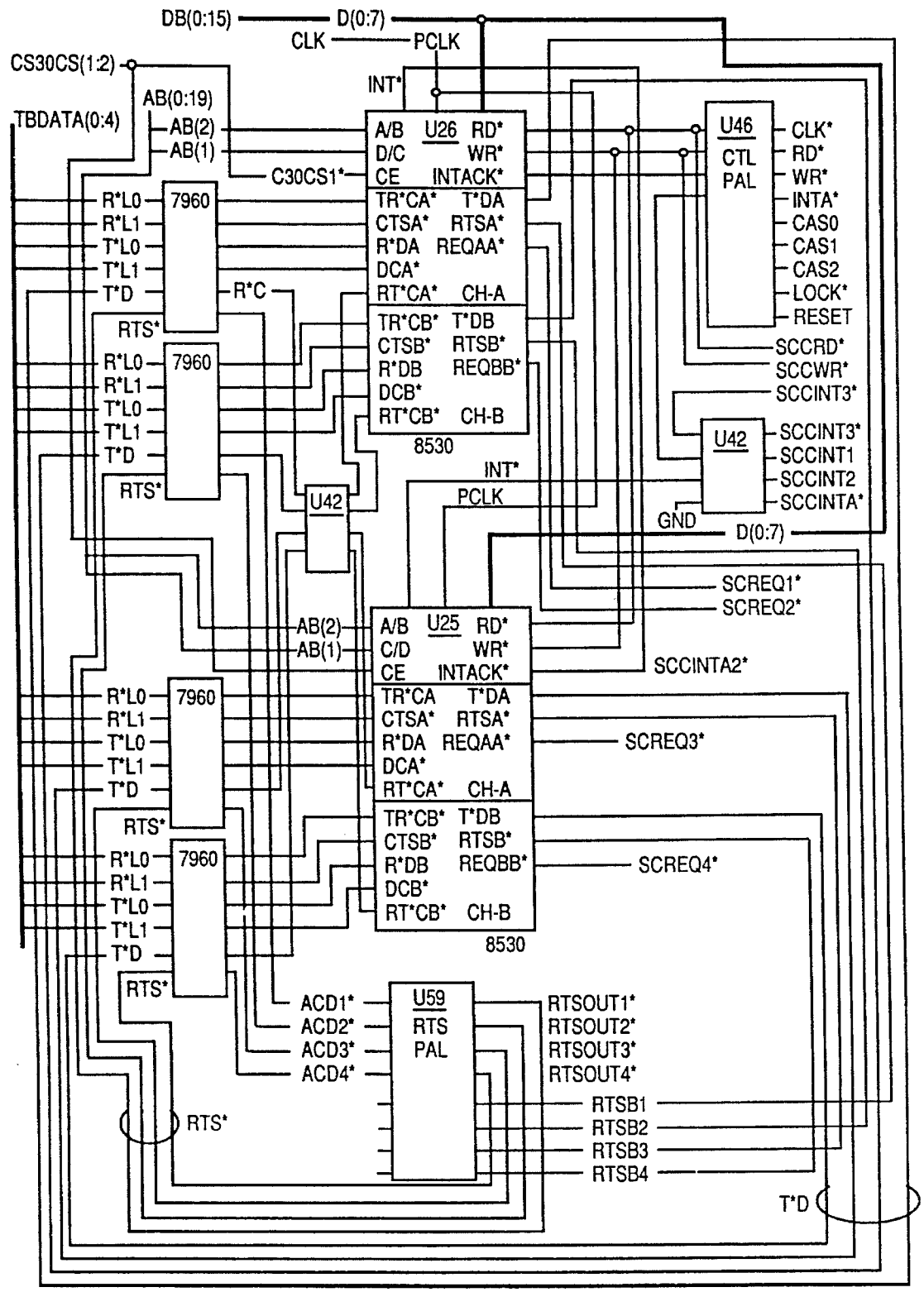
FIG. 8 illustrates schematically a portion of the Train Bus interface, including two 8530 serial controller devices U25 and U26, two pairs of 7960 Manchester encoder transceivers, control PAL U46, request to send (RTS) PAL U59 and associated buffers and major signals associated therewith according to a preferred embodiment of the invention.

Referring now to FIG. 8, illustrated schematically is a portion of the Train Bus interface, including two Intel 8530 serial controller devices U25 and U26, two pairs of AM7960 Manchester encoder transceivers, control PAL U46, request to send (RTS) PAL U59, associated buffers U42, and major signals associated therewith according to a preferred embodiment of the invention. Control PAL U46, together with RTS PAL U59, implement the control required for the Train Bus. The specifications for these two programmed logic devices U46 and U59, include their state transition equations, are set out in tabular form in FIGS. 18 and 19 respectively. As can be seen, the Control PAL U46 is directly connected to the 8530 serial interface controllers U25 and U26 via read, write and interrupt lines. The RTS PAL U59, provides RTSOUT signals to the 7960's and receives ACD signals from the 7960's, and RTSB signals from the four channels of the 8530's U25 and U26.

The 7960's are combined Manchester encoder/decoder and transceiver. Manchester encoding is a technique in digital communications in which, for example, a logical "1" is represented by a bipolar coded signal of a positive pulse followed by a negative pulse, and a logical "0" by a bipolar coded signal of a negative pulse followed by a positive pulse. Manchester encoding provides for higher reliability, and is advantageous in certain applications where a line must pass through galvanic isolation devices because Manchester encoding eliminates D.C. voltage due to data logic levels on the communications line, such as between vehicles of a subway train.

Figure 9:
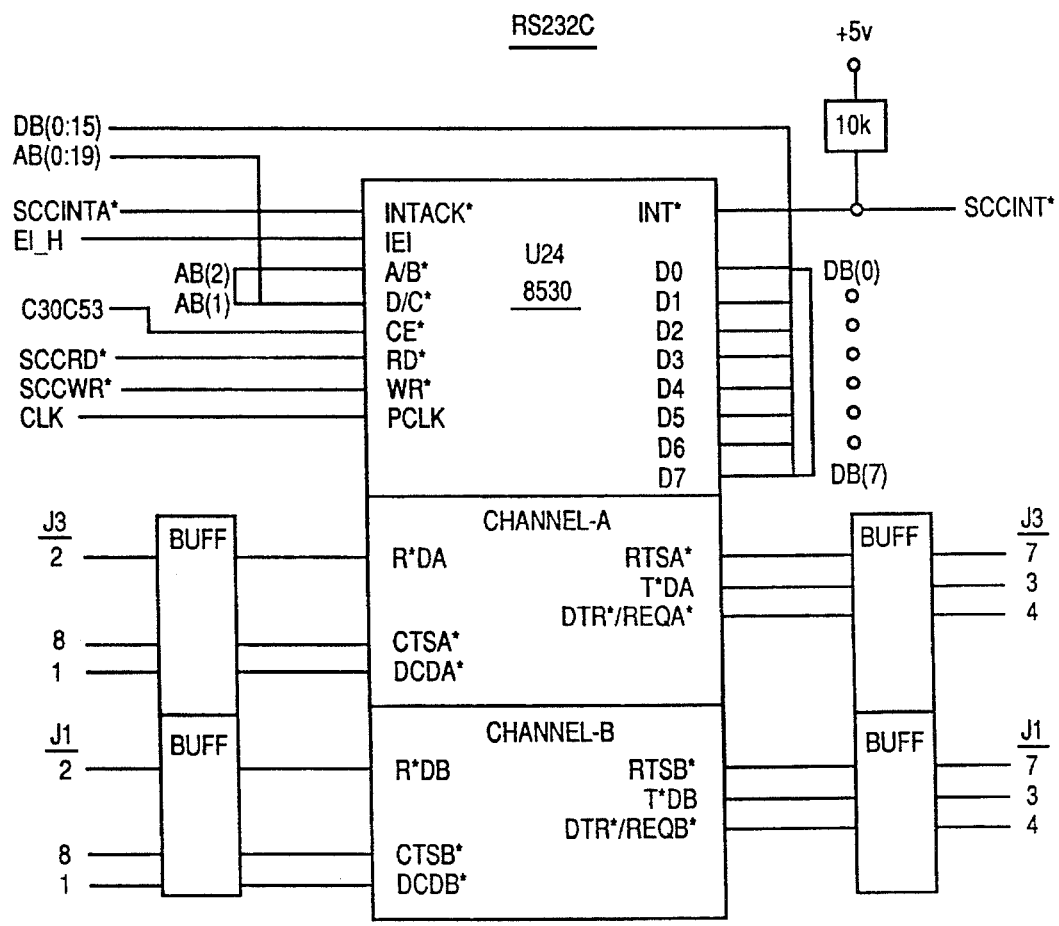
FIG. 9 illustrates schematically an 8530 serial interface controller U24 and associated buffers and major signals for implementing RS232C serial interfaces according to a preferred embodiment of the invention.

Referring now to FIG. 9, illustrated schematically is an 8530 serial interface controller U24 and associated transceivers/buffers and major signals for implementing RS232C serial interfaces according to a preferred embodiment of the invention. The RS232 serial interfaces are provided primarily for terminal equipment, and also provide a simple means of interfacing with some of the servo subsystems of a train vehicle.

Figure 10:
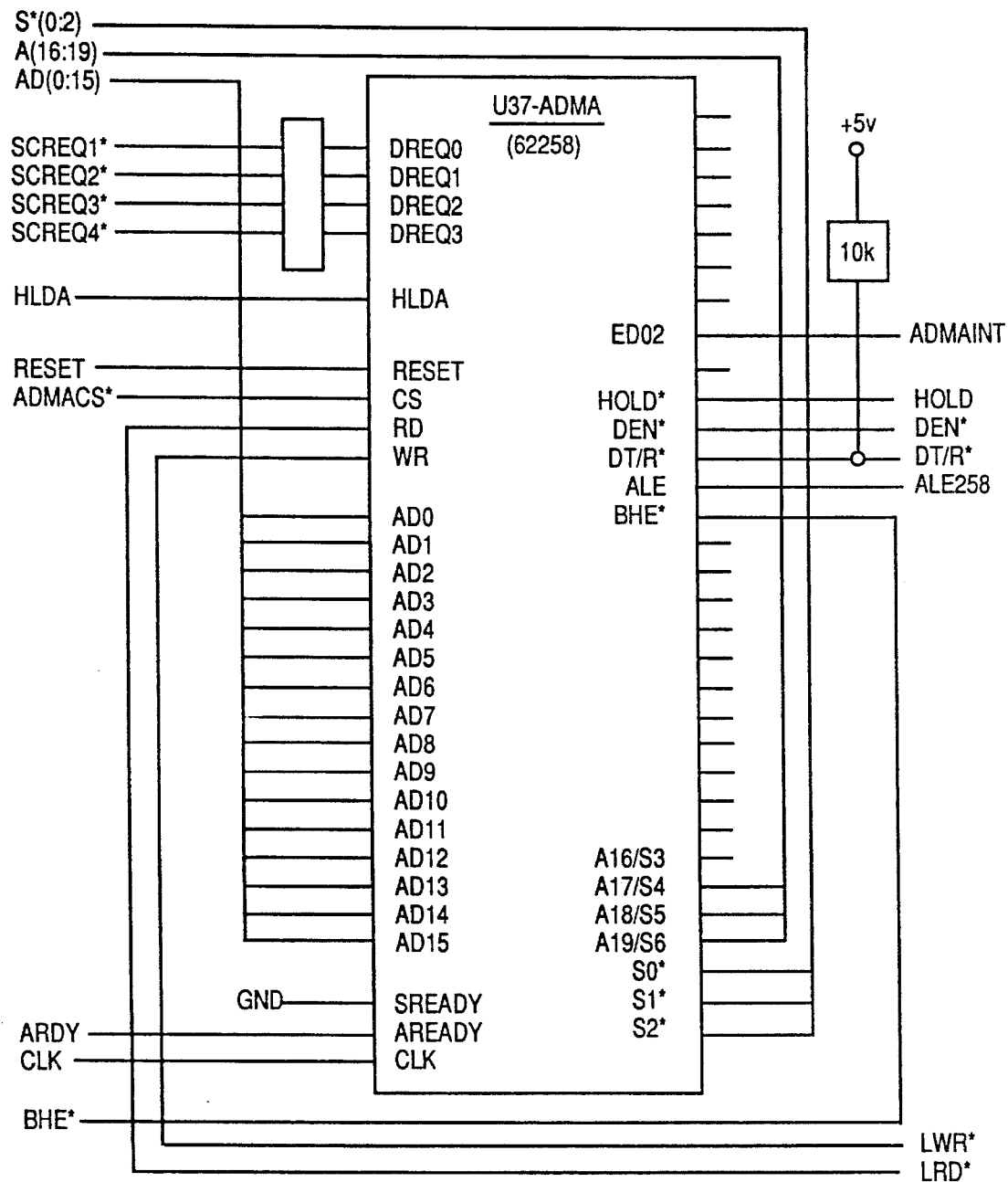
FIG. 10 illustrates schematically the 82258 direct memory addressing (DMA) controller U37 associated circuitry and major signals according to a preferred embodiment of the invention.

Referring now to FIG. 10, illustrated schematically is the Intel 62258 direct memory access (DMA) controller U37, associated circuitry and major signals according to a preferred embodiment of the invention. The 82258 DMA controller U37 includes four independent channels to service the 8530 high speed serial controllers U25 and U26 of the Train Bus interface via the SCREQI* to SCREQ4* lines. The 8530 SCCs U25 and U26 provide for serial input and output (I/O) with the ADMA U37.

Figure 11:
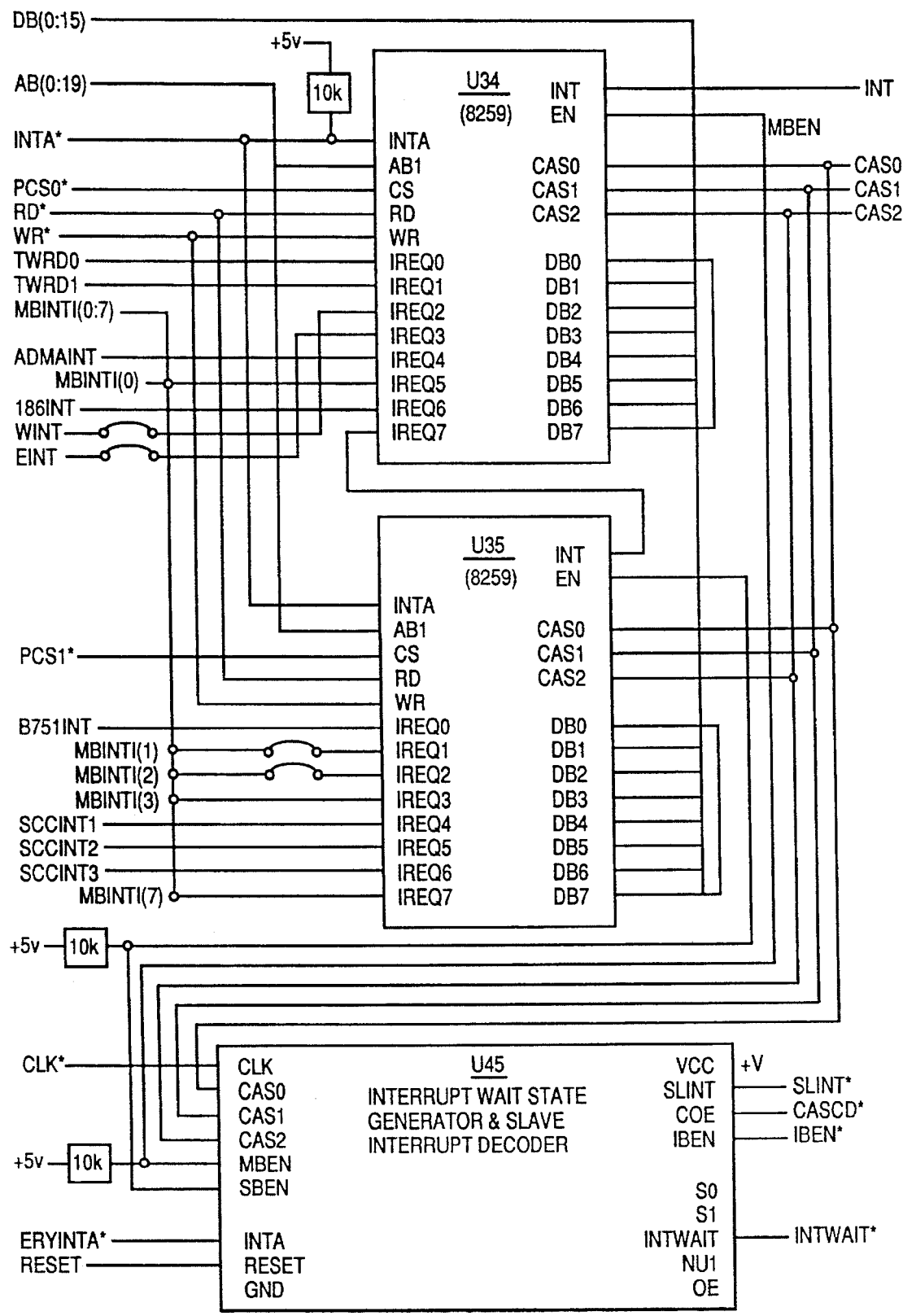
FIG. 11 illustrates schematically 8259 interrupt controllers U34 and U35, and interrupt wait state generator and slave interrupt decoder PAL U45 according to a preferred embodiment of the invention.

Referring now to FIG. 11, illustrated schematically are Intel 8259 interrupt controllers U34 and U35, and interrupt wait state generator and slave interrupt decoder PAL U45, along with the major signals associated therewith according to a preferred embodiment of the invention. The programmed logic device U45 is specified in tabular form in FIG. 20, including state transition equations. Together with the interrupt controller U34 and U35, it provides the interrupt timing necessary to implement the bus interfaces.

Figure 12:
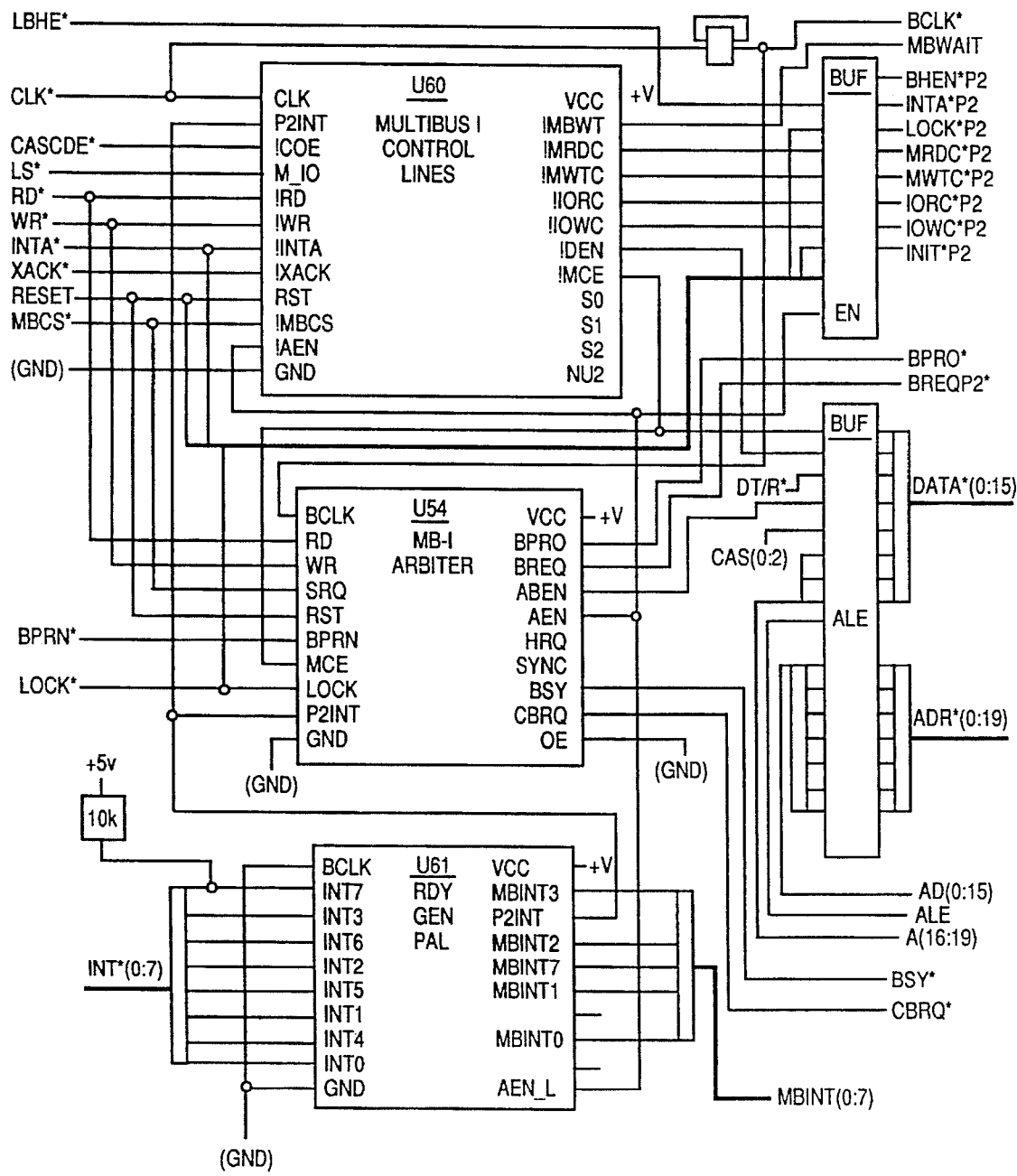
FIG. 12 illustrates schematically Multibus-I (MB-I) interface circuitry, including U60 Multibus-I control lines PAL, U54 MB-I arbiter PAL, and U61 interrupt generator control (RDY GEN) PAL according to a preferred embodiment of the invention.

Referring now to FIG. 12, illustrated schematically is the Multibus-I Vehicle Bus interface control circuitry, including U60 Multibus-I control lines PAL, U54 MB-I arbiter PAL, and U61 interrupt generator control (RDY GEN) PAL according to a preferred embodiment of the invention. Programmed logic devices U60, U54 and U61 are specified in tabular form, including state transition equations, in FIGS. 21, 22 and 23, respectively. U60 provides the control lines to implement the Multibus-I Vehicle Bus, improving over the Intel 8288 bus controller. U54 acts to arbitrate use of the Vehicle Bus, essentially being an improvement over the Intel 8289 bus Arbiter. U61 provides the Multibus-I interrupts. The boxes labelled BUF represent several individual buffers/latches combined for ease of illustration only.

Referring now to FIG. 13, shown in tabular form are the specifications, including pin signal definitions and state transition equations, for U6 the power PAL of FIG. 5 according to a preferred embodiment of the invention. FIGS. 14a–c shows in tabular form the specifications, including pin signal definitions and state transition equations, for U56 the address decoder PAL of FIG. 6 according to a preferred embodiment of the invention. FIG. 15 shows in tabular form the specifications, including pin signal definitions and state transition equations, for U53 the memory decoder PAL of FIG. 6 according to a preferred embodiment of the invention. FIG. 16 shows in tabular form the specifications, including pin signal definitions and state transition equations, for U49 the I/O decoder PAL of FIG. 6 according to a preferred embodiment of the invention. FIG. 17 shows in tabular form the specifications, including pin signal definitions and state transition equations, for U48 the decoder PAL of FIG. 6 according to a preferred embodiment of the invention. FIG. 18 shows in tabular form the specifications, including pin signal definitions and state transition equations, for U46 the 8530 serial interface control PAL of FIG. 8 according to a preferred embodiment of the invention. FIG. 19 shows in tabular form the specifications, including pin signal definitions and state transition equations, for U59 the ready to send (RTS) PAL of FIG. 8 according to a preferred embodiment of the invention. FIG. 20 shows in tabular form the specifications, including pin signal definitions and state transition equations, for U45 the interrupt wait state generator and slave interrupt decoder PAL of FIG. 11 according to a preferred embodiment of the invention. FIGS. 21a–c show in tabular form the specifications, including pin signal definitions and state transition equations, for U60 the Multibus-I (Vehicle Bus) control lines PAL of FIG. 12 according to a preferred embodiment of the invention. FIG. 22 shows in tabular form the specifications, including pin signal definitions and state transition equations, for U54 the Multibus-I (Vehicle Bus) arbiter PAL of FIG. 12 according to a preferred embodiment of the invention. And FIG. 23 shows in tabular form the specifications, including pin signal definitions and state transition equations, for U61 the interrupt generator control (RDY GEN) PAL of FIG. 12 according to a preferred embodiment of the invention.

It will be understood that the above description of the preferred embodiment of the present invention is susceptible to various modifications, changes, and adaptations, and the same are intended to be comprehended within the meaning and range of equivalents of the appended claims.

What is claimed is:

1. A microprocessor based data communications controller board, including at least one microprocessor, for controlling communications between entities over a plurality of busses having different electrical specifications and using different communications procedures, the busses including a first communications bus providing a master-slave synchronous data link controlled communications system for master and slave entities, at least one second communications bus providing a Manchester encoded master-slave high-level data link controlled communications system for master and slave entities, and a third communications bus providing a processor-to-processor message passing communications system for processor entities, the controller board comprising:

first interface means, coupled to said at least one microprocessor by address, data and control lines, for interfacing the microprocessor with said first communications bus providing a master-slave synchronous data link controlled communications system;

second interface means, coupled to said at least one microprocessor by address, data and control lines, for interfacing the microprocessor with said at least one second communications bus providing a Manchester encoded master-slave high-level data link controlled communications system; and third interface means, coupled to said at least one microprocessor by address, data and control lines, for interfacing the microprocessor with said third communications bus providing a processor-to-processor message passing communications system;

wherein said microprocessor controls the operation of said first interface means, said second interface means, and said third interface means to control the operation of said first bus, said at least one second bus, and said third bus, so that data, including control messages, are conveyed over said first bus, said at least one second bus, and said third bus, between and among said microprocessor and the respective entities; and wherein the second interface means includes:

at least one serial interface controller, operatively connected to the microprocessor, for providing high-speed serial data transfer;

at least one Manchester encoded data transceiver, operatively connected to the at least one serial interface controller and to the at least one second communications bus, for sending and receiving high-speed serial data between said at least one serial interface controller and said at least one second communications bus, and for encoding/decoding data on said at least one second communications bus into/from Manchester encoded data;

a direct memory access controller, operatively connected to the at least one serial interface controller and to the at least one microprocessor, for providing high-speed data transfer with the at least one serial controller;

an interrupt controller, operatively connected to the direct memory access controller, to the at least one serial interface controller and to the at least one microprocessor, for interrupting the microprocessor to signal that input/output is requested by said at least one serial interface controller; and a serial bus programmed logic device controller means, operatively connected to the at least one serial interface controller, to the direct memory access controller and to the at least one microprocessor, for receiving control signals from said microprocessor and for controlling operation of the second communications bus providing a Manchester encoded master-slave high-level data link controlled communications system by controlling operation of the at least one serial interface controller and the direct memory access controller.

2. A plurality of microprocessor based data communications controller boards according to claim 1, one provided on each of a plurality of train vehicles, wherein the first communications bus providing a master-slave synchronous data link controlled communications system is operatively coupled to master and slave entities which include servo subsystems on a respective vehicle for communicating with said servo subsystems disposed on said respective vehicle;

wherein said at least one second communications bus providing a Manchester encoded master-slave high-level data link controlled communications system is operatively coupled between adjacent train vehicles for facilitating communication between master and slave entities on the train vehicles; and wherein the third communications bus providing a processor-to-processor message passing communications system is operatively coupled to an external host processing system disposed on a respective vehicle for communication with said host processing system disposed on said respective vehicle.

3. A microprocessor based data communications controller board, including at least one microprocessor, for controlling communications between entities over a plurality of busses having different electrical specifications and using different communications procedures, the busses including a first communications bus providing a master-slave synchronous data link controlled communications system for master and slave entities, at least one second communications bus providing a Manchester encoded master-slave high-level data link controlled communications system for master and slave entities, and a third communications bus providing a processor-to-processor message passing communications system for processor entities, the controller board comprising:

first interface means, coupled to said at least one microprocessor by address, data and control lines, for interfacing the microprocessor with said first communications bus providing a master-slave synchronous data link controlled communications system;

second interface means, coupled to said at least one microprocessor by address, data and control lines, for interfacing the microprocessor with said at least one second communications bus providing a Manchester encoded master-slave high-level data link controlled communications system; and third interface means, coupled to said at least one microprocessor by address, data and control lines, for interfacing the microprocessor with said third communications bus providing a processor-to-processor message passing communications system;

wherein said microprocessor controls the operation of said first interface means, said second interface means, and said third interface means to control the operation of said first bus, said at least one second bus, and said third bus, so that data, including control messages, are conveyed over said first bus, said at least one second bus, and said third bus, between and among said microprocessor and the respective entities; and wherein the third interface means includes:

a message passing coprocessor, operatively connected to the at least one microprocessor, for providing processor-to-processor bus control signals and for controlling data transfers between entities on said third communications bus;

an interconnect space microcontroller, operatively connected to the message passing coprocessor, for providing an interconnect space through a plurality of registers accessed by entities on said third communications bus;

buffering means, operatively connected to the third communications bus, to the interconnect space microcontroller and to the message passing coprocessor, for buffering signals to/from said message passing coprocessor and said interconnect space microcontroller with the third communications bus; and a programmed logic device parallel bus controller means, operatively connected to the message passing coprocessor, to the interconnect space microcontroller, to the at least one microprocessor and to the buffering means, for controlling the operation of the third communications bus providing a processor-to-processor message passing communications system.

4. A plurality of microprocessor based data communications controller boards according to claim 3, one provided on each of a plurality of train vehicles, wherein the first communications bus providing a master-slave synchronous data-link controlled communications system is operatively coupled to master and slave entities which include servo subsystems on a respective vehicle for communicating with said servo subsystems disposed on said respective vehicle;

wherein said at least one second communications bus providing a Manchester encoded master-slave high-level data link controlled communications system is operatively coupled between adjacent train vehicles for facilitating communication between master and slave entities on the train vehicles; and wherein the third communications bus providing a processor-to-processor message passing communications system is operatively coupled to an external host processing system disposed on a respective vehicle for communication with said host processing system disposed on said respective vehicle.

* * * * *